United States Patent
Tanaka et al.

(10) Patent No.: US 6,917,446 B2
(45) Date of Patent: Jul. 12, 2005

(54) IMAGE PROCESSING APPARATUS AND IMAGE PROCESSING METHOD

(75) Inventors: Kei Tanaka, Osaka (JP); Shinji Hayashi, Osaka (JP); Kenji Katsuhara, Osaka (JP); Eri Iwata, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 809 days.

(21) Appl. No.: 09/939,771

(22) Filed: Aug. 28, 2001

(65) Prior Publication Data

US 2002/0054308 A1 May 9, 2002

(30) Foreign Application Priority Data

Sep. 21, 2000 (JP) ...................................... 2000-287507
Sep. 21, 2000 (JP) ...................................... 2000-287508

(51) Int. Cl.⁷ ............................................. G06K 15/00
(52) U.S. Cl. ...................... 358/1.9; 358/3.03; 382/251; 382/252
(58) Field of Search ........................ 358/1.9, 2.1, 3.03, 358/426.14, 443, 448; 382/251, 252, 260, 264, 274, 275

(56) References Cited

U.S. PATENT DOCUMENTS

2001/0028726 A1 * 10/2001 Miyake ...................... 382/100

FOREIGN PATENT DOCUMENTS

| JP | 6-70170 | 3/1994 | ............ H04N/1/40 |
| JP | 11-136510 | 5/1999 | ............ H04N/1/405 |
| JP | 2001257880 | * 9/2001 | ............ H04N/1/405 |

OTHER PUBLICATIONS

JPO Office Action dated Dec. 16, 2002.
Translation of JPO Office Action dated Dec. 16, 2002.

* cited by examiner

Primary Examiner—Jerome Grant, II
(74) Attorney, Agent, or Firm—Smith, Gambrell & Russell, LLP

(57) ABSTRACT

An image processing apparatus for quantizing image data indicative of a density gradation level of a constituent pixel of an image into a discrete value on the basis of quantization levels of a number smaller than the maximum density gradation level and not smaller than two. The apparatus comprises: an N-level/M-level quantization circuit for quantizing image data of an object pixel on an N-level basis or on an M-level basis; an error diffusion circuit for distributing an error generated through the N-level quantization or the M-level quantization to peripheral pixels around the object pixel; an N-level quantization threshold setting circuit for setting an N-level quantization threshold in a periodically variable manner; and a process setting circuit for causing the N-level/M-level quantization circuit to perform the M-level quantization for pixels adjacent to a pixel corresponding to either or both of a peak point and a saddle point in the periodic variation of the N-level quantization threshold and causing the N-level/M-level quantization circuit to perform the N-level quantization for pixels corresponding to the peak point and the saddle point.

18 Claims, 17 Drawing Sheets

MAIN SCANNING DIRECTION

SUB-SCANNING DIRECTION

FIG. 15

| DATA VALUE OF OBJECT PIXEL | VARIABLE THRESHOLD 1(V1) | | | | VARIABLE THRESHOLD 2(V2) | | | | VARIABLE THRESHOLD 3(V3) | | | |
|---|---|---|---|---|---|---|---|---|---|---|---|---|
| | 0 | 1 | 2 | 3 | 0 | 1 | 2 | 3 | 0 | 1 | 2 | 3 |
| 0~7 | 127 | 127 | 127 | 127 | 127 | 127 | 127 | 127 | 127 | 127 | 127 | 127 |
| 8~15 | 100 | 100 | 140 | 155 | 100 | 115 | 140 | 155 | 100 | 127 | 140 | 155 |
| 16~23 | 50 | 70 | 155 | 205 | 50 | 100 | 155 | 205 | 50 | 130 | 155 | 205 |
| 24~16 | 50 | 70 | 155 | 205 | 50 | 100 | 155 | 205 | 50 | 130 | 155 | 205 |
| 32~39 | 50 | 70 | 155 | 205 | 50 | 100 | 155 | 205 | 50 | 130 | 155 | 205 |
| 40~47 | 50 | 70 | 155 | 205 | 50 | 100 | 155 | 205 | 50 | 130 | 155 | 205 |
| 48~55 | 50 | 70 | 155 | 205 | 50 | 100 | 155 | 205 | 50 | 130 | 155 | 205 |
| 56~63 | 50 | 70 | 155 | 205 | 50 | 100 | 155 | 205 | 50 | 130 | 155 | 205 |
| 64~71 | 50 | 70 | 155 | 205 | 50 | 100 | 155 | 205 | 50 | 130 | 155 | 205 |
| 72~79 | 50 | 70 | 155 | 205 | 50 | 100 | 155 | 205 | 50 | 130 | 155 | 205 |
| 80~87 | 50 | 70 | 155 | 205 | 50 | 100 | 155 | 205 | 50 | 130 | 155 | 205 |
| 88~95 | 50 | 70 | 155 | 205 | 50 | 100 | 155 | 205 | 50 | 130 | 155 | 205 |
| 96~103 | 50 | 70 | 155 | 205 | 50 | 100 | 155 | 205 | 50 | 130 | 155 | 205 |
| 104~111 | 50 | 70 | 155 | 205 | 50 | 100 | 155 | 205 | 50 | 130 | 155 | 205 |
| 112~119 | 50 | 70 | 155 | 205 | 50 | 100 | 155 | 205 | 50 | 130 | 155 | 205 |
| 120~127 | 50 | 70 | 155 | 205 | 50 | 100 | 155 | 205 | 50 | 130 | 155 | 205 |
| 128~135 | 50 | 70 | 155 | 205 | 50 | 100 | 155 | 205 | 50 | 130 | 155 | 205 |
| 136~143 | 50 | 70 | 155 | 205 | 50 | 100 | 155 | 205 | 50 | 130 | 155 | 205 |
| 144~151 | 50 | 70 | 155 | 205 | 50 | 100 | 155 | 205 | 50 | 130 | 155 | 205 |
| 152~159 | 50 | 70 | 155 | 205 | 50 | 100 | 155 | 205 | 50 | 130 | 155 | 205 |
| 160~167 | 50 | 70 | 155 | 205 | 50 | 100 | 155 | 205 | 50 | 130 | 155 | 205 |
| 168~175 | 50 | 70 | 155 | 205 | 50 | 100 | 155 | 205 | 50 | 130 | 155 | 205 |
| 176~183 | 50 | 70 | 155 | 205 | 50 | 100 | 155 | 205 | 50 | 130 | 155 | 205 |
| 184~191 | 50 | 70 | 155 | 205 | 50 | 100 | 155 | 205 | 50 | 130 | 155 | 205 |
| 192~199 | 50 | 70 | 155 | 205 | 50 | 100 | 155 | 205 | 50 | 130 | 155 | 205 |
| 200~207 | 50 | 70 | 155 | 205 | 50 | 100 | 155 | 205 | 50 | 130 | 155 | 205 |
| 208~215 | 50 | 70 | 155 | 205 | 50 | 100 | 155 | 205 | 50 | 130 | 155 | 205 |
| 216~223 | 50 | 70 | 155 | 205 | 50 | 100 | 155 | 205 | 50 | 130 | 155 | 205 |
| 224~231 | 50 | 70 | 155 | 205 | 50 | 100 | 155 | 205 | 50 | 130 | 155 | 205 |
| 232~239 | 50 | 70 | 155 | 205 | 50 | 100 | 155 | 205 | 50 | 130 | 155 | 205 |
| 240~247 | 50 | 70 | 155 | 205 | 50 | 100 | 155 | 205 | 50 | 130 | 155 | 205 |
| 248~255 | 50 | 70 | 155 | 205 | 50 | 100 | 155 | 205 | 50 | 130 | 155 | 205 |

VARIABLE THRESHOLD SELECTION INFORMATION (MATRIX ELEMENT VALUE)

VARIABLE THRESHOLD SELECTION INFORMATION (MATRIX ELEMENT VALUE)

VARIABLE THRESHOLD SELECTION INFORMATION (MATRIX ELEMENT VALUE)

T1　T2　T3

IMAGE PROCESSING APPARATUS AND IMAGE PROCESSING METHOD

BACKGROUND OF THE INVENTION

1. Field of the Invention

The present invention relates to an image processing apparatus and an image processing method for performing a so-called error diffusion process.

2. Description of Related Art

In image forming apparatuses such as digital copying machines, printers and facsimile machines, a so-called pseudo-halftoning process is performed when multi-level image data indicative of density gradation levels is converted into two-level image data. Particularly, multi-level image data representing a photograph image includes a lot of halftone image data, so that the pseudo-halftoning process is indispensable. One example of the pseudo-halftoning process is an error diffusion process.

In the error diffusion process, an error generated when multi-level image data of an object pixel is converted into two-level image data with the use of a predetermined threshold is diffused to peripheral pixels yet to be subjected to the two-level quantization around the object pixel for modifying multi-level image data of the peripheral pixels, and this error diffusing operation is repeatedly performed. Thus, the density of dots to be outputted from an image forming section is properly controlled, whereby an image represented on a pseudo-halftone basis is outputted. Image forming sections are mostly adapted to form an image on a recording sheet through an electrophotographic process.

An explanation will be given to a case where pixels having image data (white: 0, black: 255) representing multi-level densities on the basis of 256 gradation levels are quantized on a two-level basis through the error diffusion process (two-level error diffusion process);

In the error diffusion process, image data of an object pixel to be compared with a two-level quantization threshold is obtained by adding a cumulative error (the sum of errors distributed to the object pixel from other pixels) to image data of the object pixel indicative of an original multi-level density.

Assuming that the threshold to be employed for the two-level quantization is set at 127 which is a middle value of the 256-level gradation, whether the two-level density of the object pixel is at a white level (0) or at a black level (1) is judged on the basis of the following conditions (A) and (B):

(A) If (Value of object pixel)+(Cumulative error)>127, the two-level density of the object pixel is set at the black level (1); and (B) If (Value of object pixel)+(Cumulative error)≦127, the two-level density of the object pixel is set at the white level (0).

The error generated when the judgment is made on the basis of the conditions (A) and (B) is distributed to peripheral pixels yet to be subjected to the two-level quantization around the object pixel. When the object pixel satisfies either of the aforesaid conditions (A) and (B), the error is calculated from the following expressions (A1) or (B1) with the black level (1) and the white level (0) in the two-level gradation representation being respectively defined as corresponding to 255 and 0 in the 256-level gradation representation.

Error={(Cumulative error)+(Object pixel value)}−255  (A1)

Error={(Cumulative error)+(Object pixel value)}−0  (B1)

The error thus calculated is distributed to the peripheral pixels at a predetermined diffusion ratio.

In such an ordinary error diffusion process, dot distribution is at random, resulting in generation of a lot of isolated dots. In the image formation through the electrophotographic process, however, it is impossible to accurately control the size of each of the isolated dots, because dots in an image do not always have a stable size. Where the ordinary error diffusion process is applied to the image formation through the electrophotographic process, gradation representation cannot satisfactorily be stabilized. Therefore, the ordinary error diffusion process is not always suitable for reproduction of a photograph image.

Another example of the halftoning process is an organized dithering process. The organized dithering process includes a dot distribution method (frequency modulation method) in which dots having the same size are distributed at various densities in accordance with gradation levels, and a dot concentration method (amplitude modulation method) in which dots having different diameters according to gradation levels are arranged with the centers thereof being equidistantly spaced from one another. Of these methods, the dot concentration method is more suitable for halftone representation through the electrophotographic process in consideration of the stabilization of the gradation representation.

SUMMARY OF THE INVENTION

In Japanese Patent Application No. 11-352825 (1999) previously filed, the inventors of the present invention have proposed an improved error diffusion process in which a threshold to be employed for a two-level quantization process is periodically two-dimensionally varied for enhancement of the dot concentration degree. In the improved error diffusion process, dots are liable to be periodically concentrated, so that a so-called dotting process can be performed. Although the organized dithering process poses a problem associated with the resolution of character images and diagrammatic images, the improved error diffusion process can ensure satisfactory resolution of the character images and the diagrammatic images.

By employing the improved error diffusion process for the pseudo-halftoning process, the image processing can advantageously be simplified without the need for performing different processing operations depending on the type of an image area to which a pixel belongs.

In the improved error diffusion process of the previous application, however, the gradation representation of the photograph image is not necessarily satisfactory.

For example, pixels are respectively quantized on a two-level basis, so that the expansion and contraction of dots liable to periodically occur are controlled on a pixel-by-pixel basis with a greater level difference. This deteriorates the gradation representation.

Where the threshold to be employed is greatly changed from the middle level to a white level side or to a black level side in the improved error diffusion process, there arises a problem such that a greater two-level quantization error is generated. If the two-level quantization threshold is fixed at 127, the maximum error is 127 as shown in FIG. 18(a). On the contrary, if the two-level quantization threshold is greatly changed to the black level side, a two-level quantization error greater than 127 is generated as shown in FIG. 18(b).

The greater error is distributed to peripheral pixels, which in turn have greater image data values. Hence, there is a high possibility that the peripheral pixels are converted into black pixels through the two-level quantization process.

In the prior art, the variation of the threshold correspondingly varies the error and, hence, there is a high possibility that white pixels and black pixels alternately occur. As a result, the intended dot concentration cannot effectively be achieved.

It is a first object of the present invention to provide an image processing apparatus and an image processing method which can achieve a pseudo-halftoning process for excellent gradation representation through the error diffusion process by increasing or reducing the number of quantization levels to be employed for quantization of image data indicative of a multi-level density gradation level.

It is a second object of the present invention to provide an image processing apparatus and an image processing method which allow for effective dot concentration by suppressing the variation of an error caused due to the variation of a quantization threshold to ensure an excellent gradation reproducibility.

The present invention is directed to an image processing apparatus for quantizing image data indicative of a density gradation level of a constituent pixel of an image into a discrete value on the basis of quantization levels of a number smaller than the maximum density gradation level and not smaller than two. In accordance with a first aspect of the present invention, there is provided an image processing apparatus which comprises: an N-level/M-level quantization circuit (63) for performing an N-level quantization process with the use of (N−1) N-level quantization thresholds (wherein N is an integer satisfying a relationship of (maximum density gradation level)>N≧2) or performing an M-level quantization process with the use of (M−1) M-level quantization thresholds (wherein M is an integer satisfying a relationship of (maximum density gradation level)>M>N) for quantization of image data of an object pixel on an N-level basis or on an M-level basis; an error diffusion circuit (61, 62, 64, 65, 66) for distributing an error generated through the N-level quantization process or the M-level quantization process performed by the N-level/M-level quantization circuit to peripheral pixels yet to be subjected to the N-level quantization process or the M-level quantization process around the object pixel for modification of image data of the peripheral pixels; an N-level quantization threshold setting circuit (80, 85) for setting the N-level quantization thresholds to be used in the N-level/M-level quantization circuit in a periodically variable manner; and a process setting circuit (81 to 83) for causing the N-level/M-level quantization circuit to perform the M-level quantization process for pixels adjacent to a pixel corresponding to at least one of a peak point and a saddle point in the periodic variation of the N-level quantization thresholds and causing the N-level/M-level quantization circuit to perform the N-level quantization process for pixels corresponding to the peak point and the saddle point. Parenthesized alphanumeric characters denote components corresponding to those described later in the embodiment of the invention, but do not intend to limit the respective components to those described in the embodiment. This definition is effectual in this section.

With this arrangement, the image data of each constituent pixel of the image is quantized on an N-level basis or on an M-level basis. The N-level quantization thresholds are set in a periodically variable manner (e.g., in a periodically one-dimensionally or two-dimensionally variable manner). The pixels adjacent to the pixel corresponding to at least one of the peak point and the saddle point in the periodic variation of the N-level quantization thresholds are subjected to the M-level quantization process. Thus, pixels adjacent to a pixel liable to be formed with a dot are subjected to the M-level quantization process for gradation representation, so that a dot expansion or contraction level can finely be controlled. This improves the gradation reproducibility.

The N-level/M-level quantization circuit may be adapted to perform the N-level quantization process for pixels adjacent to pixels corresponding to a peak point and a saddle point in periodic variation of the M-level quantization thresholds, and to perform the M-level quantization process for pixels adjacent to the pixels subjected to the N-level quantization process. Further, pixels around the pixels subjected to the M-level quantization process (pixels located opposite from the pixel corresponding to the peak point or the saddle point in the periodic variation of the N-level thresholds) may be subjected to an L-level quantization process (wherein L is an integer satisfying a relationship of (maximum density gradation level)>L>M).

The N-level/M-level quantization circuit may be adapted to perform the M-level quantization process only for the pixels adjacent to the pixel corresponding to at least one of the peak point and the saddle point in the periodic variation of the N-level quantization thresholds, and to perform the N-level quantization process for the other pixels.

The N-level quantization process maybe a two-level quantization process. That is, the improved error diffusion process employing a periodically variable two-level quantization threshold may be performed basically, and a quantization process on the basis of three or more levels may be performed only for pixels adjacent to a dot.

The N-level quantization threshold setting circuit may be adapted to set the N-level quantization thresholds, for example, on the basis of a variable threshold matrix having matrix element values defined in a periodically variable manner (e.g., in a periodically two-dimensionally variable manner), and the process setting circuit may be adapted to cause the N-level/M-level quantization circuit to perform the M-level quantization process for a pixel corresponding to a matrix position of a specific matrix element value in the variable threshold matrix (e.g., only for the pixel corresponding to the matrix position of the specific matrix element in the variable threshold matrix).

The process setting circuit preferably includes a circuit for defining the specific matrix element value on the basis of an average value of image data of pixels within a region of a predetermined size containing the object pixel and pixels around the object pixel. Thus, pixels constituting the periphery of a dot can assuredly be subjected to the M-level quantization process depending on whether the pixels belong to a higher density area or a lower density area.

The N-level quantization threshold setting circuit may include a circuit (81 to 83) for variably setting the N-level quantization thresholds in accordance with the image data of the object pixel. Particularly in the quantization of the lower density area, a greater density variation is liable to occur in an output image due to variation of the M-level quantization thresholds. The density variation in the output image may result in a so-called texture. The texture can be suppressed by variably setting the N-level quantization thresholds in accordance with the image data (density gradation level) of the object pixel.

The image processing apparatus preferably further includes a circuit (81 to 83) for variably setting the M-level quantization thresholds to be used in the N-level/M-level quantization circuit in accordance with the image data of the object pixel. Thus, the texture can properly be suppressed.

In accordance with a second aspect of the present invention, there is provided an image processing apparatus which comprises: a quantization circuit (63) for quantizing image data of an object pixel with the use of a quantization threshold; an error calculating circuit (64) for calculating an error generated through the quantization performed by the quantization circuit; an error diffusion circuit (61, 62, 66) for distributing the error calculated by the error calculating circuit to peripheral pixels yet to be subjected to the quantization around the object pixel for modification of image data of the peripheral pixels; a threshold setting circuit (51, 72) for setting the quantization threshold to be used in the quantization circuit in a periodically variable manner (e.g., in a two-dimensionally periodically variable manner); and an error calculation reference value setting circuit (74, 65) for variably setting a reference value to be used for the error calculation in the error calculating circuit.

In accordance with the present invention, an error generated when image data indicative of a density gradation level of a pixel is quantized into a discrete value on the basis of two or more quantization levels can be reduced to a relatively small level by variably setting the reference value for the error calculation. Thus, the variation of the error due to the periodic variation of the quantization threshold can be suppressed, so that a dot concentrating effect provided by the periodic variation of the quantization threshold can be enhanced. As a result, the error diffusion process can be performed for excellent gradation representation. Thus, a photograph image, for example, can be reproduced with excellent gradation representation.

The error calculation reference value setting circuit may be adapted to variably set the error calculation reference value so that the reference value varies in phase with the variation of the quantization threshold set by the threshold setting circuit. With this arrangement, the variation of the error due to the variation of the quantization threshold can effectively be suppressed because the error calculation reference value varies in phase with the variation of the quantization threshold.

The error calculation reference value setting circuit preferably includes a circuit for variably setting a variation range of the error calculation reference value with respect to the quantization threshold on the basis of the image data of the object pixel or an average value of image data of pixels within a region of a predetermined size containing the object pixel and pixels around the object pixel. Thus, the dot concentration can be suppressed in a lower density area, for example, by increasing the variation range, whereby incongruous dot concentration can be suppressed, allowing for excellent image reproduction. On the other hand, dots can be concentrated in a high density area by reducing the variation range, allowing for excellent gradation reproducibility.

The quantization circuit preferably includes a circuit (73) for variably setting the variation rage of the error calculation reference value in accordance with an area separation signal indicative of a type of an image area to which the object pixel belongs. Thus, the quantization threshold can periodically be varied in a relatively great variation range for the photograph image area and, correspondingly, the error calculation reference value can be varied in a relatively great variation range. At the same time, the variation of the quantization threshold can be suppressed for image areas other than the photograph image area (for example, by fixing the quantization threshold) and, hence, the variation of the error calculation reference value can be suppressed. Thus, the quantization process can be performed in accordance with the type of the image area to which the object pixel belongs.

The foregoing and other objects, features and effects of the present invention will become more apparent from the following description of the preferred embodiments with reference to the attached drawings.

BRIEF DESCRIPTION OF THE DRAWINGS

FIG. 15 is a diagram illustrating exemplary settings for variable threshold tables T1, T2 and T3;

DESCRIPTION OF THE PREFERRED EMBODIMENTS

Figure 1:
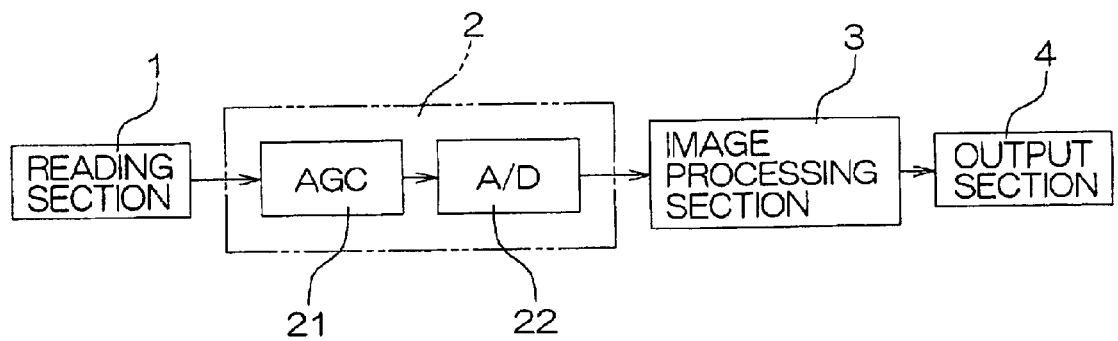
FIG. 1 is a block diagram illustrating the electrical construction of a digital copying machine which is one example of an image forming apparatus employing an image processing apparatus according to one embodiment of the present invention.

FIG. 1 is a block diagram illustrating the electrical construction of a digital copying machine which is one example of an image forming apparatus employing an image processing apparatus according to one embodiment of the present invention. The digital copying machine has a reading section 1 including a photoelectric converter (e.g., a line sensor such as a CCD) for reading an optical image of a document original and converting the optical image into electric signals.

The electric signals outputted from the reading section 1 are inputted to an analog circuit 2 having an autogain control (AGC) circuit 21 and an analog/digital (A/D) converter 22. The AGC circuit 21 functions to amplify the minute analog electric signals from the reading section 1 to a level within an A/D conversion range (reference voltage) of the A/D converter 22. The A/D converter 22 quantizes the electric signals amplified by the AGC circuit 21 for generation of digital image signals. For example, a signal of a minute amplitude (1 volt) outputted from the reading section 1 is amplified to an electric signal of a 5-volt amplitude by the AGC circuit 21, and quantized on a 8-bit basis into 0 (00h) to 255 (FFh)) by the A/D converter 22. Thus, digital image data is generated which has a density gradation level represented on a 256-level basis.

The image data is subjected to various image processing operations by an image processing section 3, and then applied to an output section 4. The output section 4 includes, for example, a laser scanning unit. That is, the digital copying machine has an image forming section for forming a copy image of the document original through an electrophotographic process. The image forming section includes a photoreceptor, the laser scanning unit for forming an electrostatic latent image corresponding to the copy image of the document original on the photoreceptor, a developer unit provided around the photoreceptor, a transfer unit, and a cleaning unit. The electrostatic latent image formed on the photoreceptor by the laser scanning unit is developed into a toner image by the developer unit. The toner image is transferred onto a surface of a recording sheet such as a paper sheet or an OHP sheet (transparent sheet) in the transfer unit. The transferred toner image is subjected to a heat and press process thereby to be fixed on the recording sheet by a fixing unit.

The reading section 1 includes a light source for illuminating the document original, and an optical system for focusing light reflected from the document original onto a detection surface of the line sensor. The reading section 1 is adapted to perform a main scanning operation on the document original by electrical scanning of the line sensor and to perform a sub-scanning operation on the document original by movement of the line sensor and the optical system with respect to the document original. Of course, the sub-scanning operation on the document original may be achieved by moving the light source and the optical system or by moving the document original with the light source and the optical system kept stationary.

Figure 2:
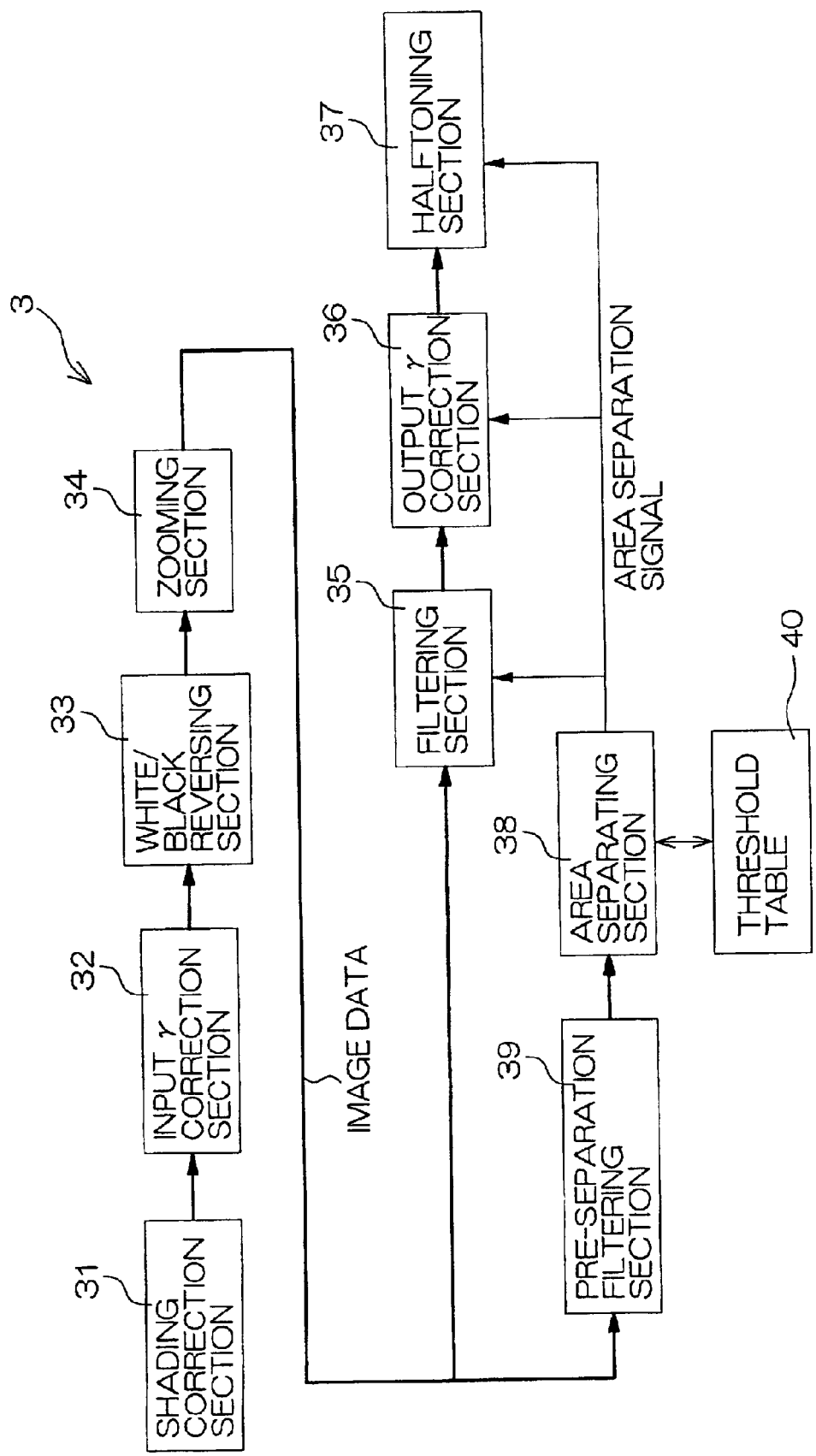
FIG. 2 is a block diagram for explaining the functional configuration of an image processing section.

FIG. 2 is a block diagram for explaining the functional configuration of the image processing section 3. The image processing section 3 includes a shading correction section 31, an input γ correction section 32, a white/black reversing section 33, a zooming section 34, a filtering section 35, an output γ correction section 36, and a halftoning section 37, which successively perform predetermined processes on the inputted image data.

The image processing section 3 further includes an area separating section 38 for judging whether or not a pixel for the inputted image data is a constituent pixel of a photograph image area, and a pre-separation filtering section 39 for pre-processing the image data to be supplied to the area separating section 38. The result of the judgment made by the area separating section 38 is inputted to the filtering section 35, the output γ correction section 36 and the halftoning section 37. The filtering section 35, the output γ correction section 36 and the halftoning section 37 each perform the predetermined process in different manners depending on whether or not the pixel for the inputted image data belongs to the photograph image area.

Even when a blank image is read, analog signals outputted from the reading section 1 are not uniform with respect to the main scanning direction. This is because the light source and the optical system each have different light distribution characteristics in a middle portion and end portions thereof with respect to the main scanning direction, and the line sensor has pixel-to-pixel sensitivity variations for reading. The shading correction section 31 makes a correction for pixel-to-pixel image data variations attributed to the characteristics of the reading section 1.

The image data processed by the shading correction section 31 is subjected to an intensity-to-density converting process performed by the input γ correction section 32. The input γ correction section 32 makes a correction for the reading characteristics of the reading section 1 for generation of image data having a gradation characteristic proportional to the density of the document original.

The white/black reversing section 33 reverses a white/black logic of the inputted image data. The reading section 1 outputs a lower voltage for a high density portion (black area) of the document original. The higher the density of the document original, the lower the output voltage of the reading section 1. By reversing the logic of the image data, the white/black reversing section 33 converts the image data so that the value of the image data increases as the density of the image increases.

The zooming section 34 carries out a zooming function through a digital process.

The filtering section 35 performs an edge emphasizing process or a smoothing process on the image data. In this embodiment, the filtering section 35 receives an area separation signal inputted from the area separating section 38. Depending on the area separation signal, the filtering section 35 performs the smoothing process on a pixel belonging to the photograph image area, and the edge emphasizing process on a pixel belonging to any other image area. Thus, the photograph image area can be reproduced with smooth gradation representation, while a character image area, a diagrammatic image area and a halftone dot image area with a lower line frequency can be reproduced with a proper resolution.

The output γ correction section 36 processes the image data to make a correction for the γ characteristic of an output engine in the output section 4. In the electrophotographic process, it is difficult to obtain an image density output linearly variable with respect to the inputted image data because of the charging properties of the photoreceptor and toner. The correction for the γ characteristic of the output engine makes it possible to obtain an image density output substantially linearly variable with respect to the inputted image data.

The halftoning section 37 converts (quantizes) the image data having a density represented on the basis of 256 gradation levels into a discrete value on the basis of not smaller than 2 levels and smaller than 256 levels for a so-called pseudo-halftoning process. In this embodiment, the halftoning section 37 is adapted to perform a two-level quantization process in principle and to perform a four-level quantization process as required.

More specifically, the halftoning section 37 is adapted to selectively perform an ordinary error diffusion process by employing quantization thresholds each fixed at a predetermined value and an improved error diffusion process (a dotting process or a dot concentration halftoning process) by employing quantization thresholds periodically two-dimensionally variable. In the improved error diffusion process, a two-level error diffusion process is basically performed, and a four-level quantization process (four-level error diffusion process) is performed on pixels adjacent to a dot concentrated area so that dot expansion and contraction can be controlled at an increased number of levels.

The selection of the ordinary error diffusion process and the improved error diffusion process to be performed by the halftoning section 37 is based on the area separation signal outputted from the area separating section 38. That is, image data of a pixel belonging to the photograph image area is subjected to the improved error diffusion process, while image data of a pixel belonging to any of the other image areas is subjected to the ordinary error diffusion process.

Figure 3:
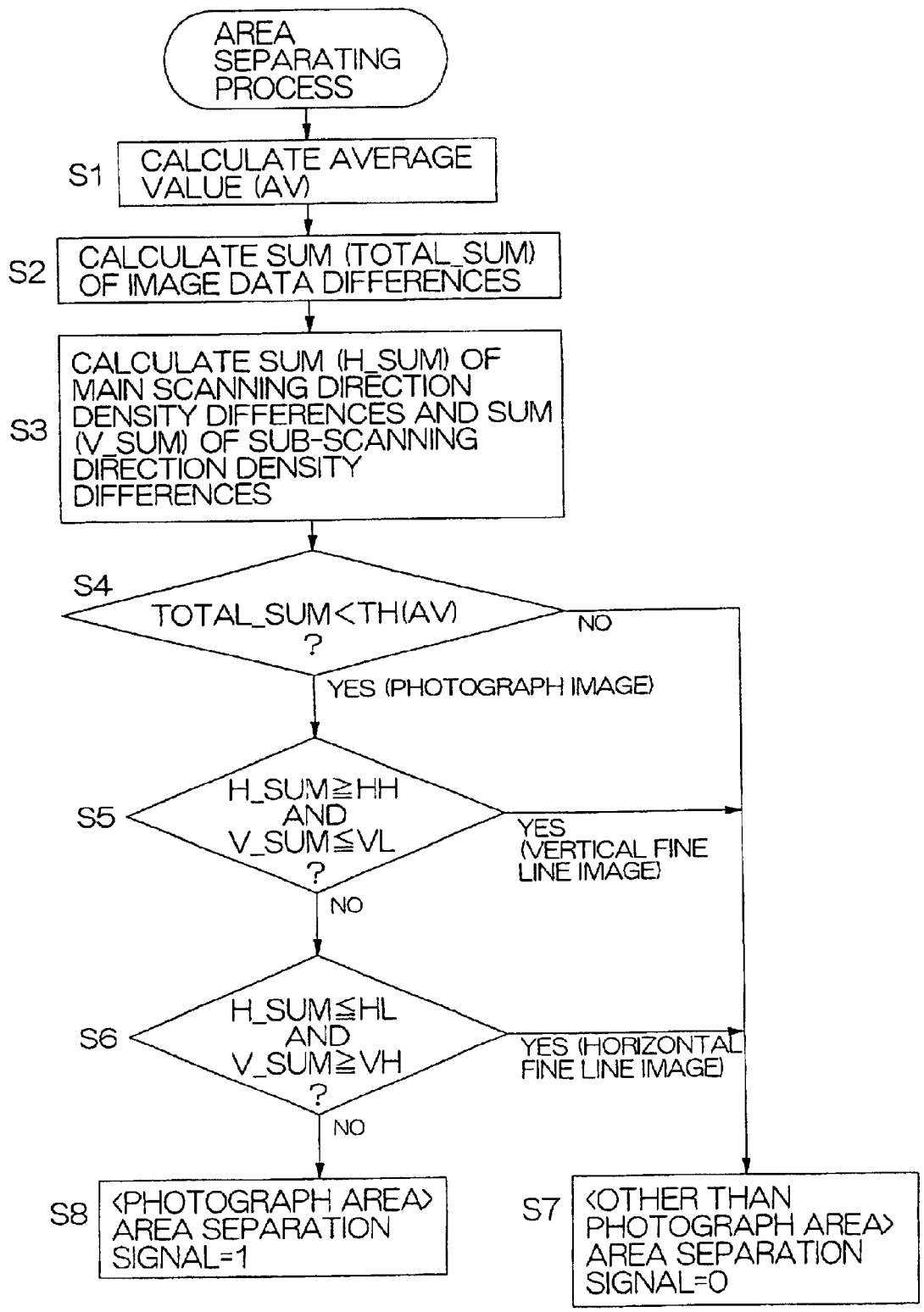
FIG. 3 is a flow chart for explaining a process to be performed by an area separating section.

FIG. 3 is a flow chart for explaining the process to be performed by the area separating section 38. Constituent pixels of a document original image read by the reading section 1 are sequentially extracted as an object pixel in a reading order by the area separating section 38, which in turn judges whether or not the object pixel belongs to the photograph image area. For this purpose, an average value of image data of pixels in a first image block of a predetermined size containing the object pixel is first calculated (Step S1).

Figure 4:
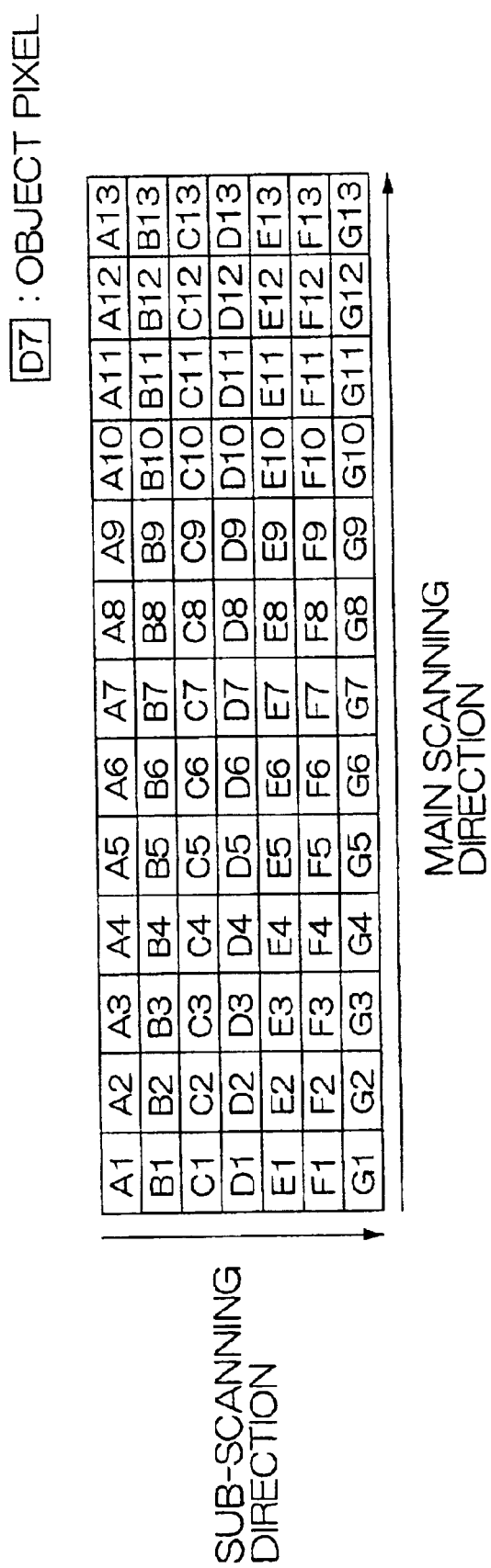
FIG. 4 is a diagram illustrating a first image block (13×7 pixel matrix) to be employed for extraction of pixels in a photograph image area.

The first image block may be a 13×7 pixel matrix consisting of pixels A1 to A13, B1 to B13, C1 to C13, D1 to D13, E1 to E13, F1 to F13 and G1 to G13 retained in a proper buffer memory with the object pixel D7 located at the center thereof as shown in FIG. 4. In this case, the average value AV of the image data of the pixels in the first image block of the 13×7 pixel matrix is calculated from the following expression (1):

$$AV = (A1 + A2 + A3 + A4 + A5 + A6 + A7 + A8 + A9 + A10 + A11 + \quad (1)$$
$$A12 + A13 + B1 + B2 + B3 + B4 + B5 + B6 + B7 + B8 + B9 +$$
$$B10 + B11 + B12 + B13 + C1 + C2 + C3 + C4 + C5 + C6 +$$
$$C7 + C8 + C9 + C10 + C11 + C12 + C13 + D1 + D2 + D3 +$$
$$D4 + D5 + D6 + D7 + D8 + D9 + D10 + D11 + D12 + D13 +$$
$$E1 + E2 + E3 + E4 + E5 + E6 + E7 + E8 + E9 + E10 + E11 +$$
$$E12 + E13 + F1 + F2 + F3 + F4 + F5 + F6 + F7 + F8 +$$
$$F9 + F10 + F11 + F12 + F13 + G1 + G2 + G3 + G4 + G5 +$$
$$G6 + G7 + G8 + G9 + G10 + G11 + G12 + G13) \div (13 \times 7)$$

The area separating section 38 determines differences in image data between respective adjacent pairs of pixels in the first image block of the 13×7 pixel matrix, and calculates a sum of the image data differences for all the pixels in the matrix (Step S2).

More specifically, the area separating section 38 calculates a sum TOTAL_DH of image data differences between pixels aligning in the main scanning direction of the reading section 1 from the following expression (2), and calculates a sum TOTAL_DV of image data differences between pixels aligning in the sub-scanning direction of the reading section 1 from the following expression (3). Then, these sums are totaled for determination of the sum TOTAL_SUM of the image data differences in the 13×7 pixel matrix (see the following expression (4)). Of course, the sum TOTAL_SUM of the image data differences may directly be determined without the determination of TOTAL_DH and TOTAL_DV.

$$\begin{aligned}
\text{TOTAL\_DH} = \quad & |A1 - A2| + |A2 - A3| + |A3 - A4| + |A4 - A5| + |A5 - A6| + \\
& |A6 - A7| + |A7 - A8| + |A8 - A9| + |A9 - A10| + |A10 - A11| + \\
& |A11 - A12| + |A12 - A13| + |B1 - B2| + |B2 - B3| + |B3 - B4| + \\
& |B4 - B5| + |B5 - B6| + |B6 - B7| + |B7 - B8| + |B8 - B9| + \\
& |B9 - B10| + |B10 - B11| + |B11 - B12| + |B12 - B13| + \\
& |C1 - C2| + |C2 - C3| + |C3 - C4| + |C4 - C5| + |C5 - C6| + \\
& |C6 - C7| + |C7 - C8| + |C8 - C9| + |C9 - C10| + |C10 - C11| + \\
& |C11 - C12| + |C12 - C13| + |D1 - D2| + |D2 - D3| + |D3 - D4| + \\
& |D4 - D5| + |D5 - D6| + |D6 - D7| + |D7 - D8| + |D8 - D9| + \\
& |D9 - D10| + |D10 - D11| + |D11 - D12| + |D12 - D13| + \\
& |E1 - E2| + |E2 - E3| + |E3 - E4| + |E4 - E5| + |E5 - E6| + \\
& |E6 - E7| + |E7 - E8| + |E8 - E9| + |E9 - E10| + |E10 - E11| + \\
& |E11 - E12| + |E12 - E13| + |F1 - F2| + |F2 - F3| + |F3 - F4| + \\
& |F4 - F5| + |F5 - F6| + |F6 - F7| + |F7 - F8| + |F8 - F9| + \\
& |F9 - F10| + |F10 - F11| + |F11 - F12| + |F12 - F13|
\end{aligned} \quad (2)$$

$$\begin{aligned}
\text{TOTAL\_DV} = \quad & |A1 - B1| + |B1 - C1| + |C1 - D1| + |D1 - E1| + \\
& |E1 - F1| + |F1 - G1| + |A2 - B2| + |B2 - C2| + |C2 - D2| + \\
& |D2 - E2| + |E2 - F2| + |F2 - G2| + |A3 - B3| + |B3 - C3| + \\
& |C3 - D3| + |D3 - E3| + |E3 - F3| + |F3 - G3| + |A4 - B4| + \\
& |B4 - C4| + |C4 - D4| + |D4 - E4| + |E4 - F4| + |F4 - G4| + \\
& |A5 - B5| + |B5 - C5| + |C5 - D5| + |D5 - E5| + |E5 - F5| + \\
& |F5 - G5| + |A6 - B6| + |B6 - C6| + |C6 - D6| + |D6 - E6| + \\
& |E6 - F6| + |F6 - G6| + |A7 - B7| + |B7 - C7| + |C7 - D7| + \\
& |D7 - E7| + |E7 - F7| + |F7 - G7| + |A8 - B8| + |B8 - C8| + \\
& |C8 - D8| + |D8 - E8| + |E8 - F8| + |F8 - G8| + |A9 - B9| + \\
& |B9 - C9| + |C9 - D9| + |D9 - E9| + |E9 - F9| + |F9 - G9| + \\
& |A10 - B10| + |B10 - C10| + |C10 - D10| + |D10 - E10| + \\
& |E10 - F10| + |F10 - G10| + |A11 - B11| + |B11 - C11| + \\
& |C11 - D11| + |D11 - E11| + |E11 - F11| + |F11 - G11| + \\
& |A12 - B12| + |B12 - C12| + |C12 - D12| + |D12 - E12| + \\
& |E12 - F12| + |F12 - G12| + |A13 - B13| + |B13 - C13| + \\
& |C13 - D13| + |D13 - E13| + |E13 - F13| + |F13 - G13|
\end{aligned} \quad (3)$$

$$\text{TOTAL\_SUM} = \text{TOTAL\_DH} + \text{TOTAL\_DV} \quad (4)$$

The area separating section 38 further judges whether or not the object pixel belongs to the thin line image area (a horizontal thin line image area or a vertical thin line image area) to discriminate the horizontal thin line image area and the vertical thin line image area from the photograph image area. The horizontal thin line image area herein means an area in which horizontal lines extending parallel to each other in the main scanning direction of the reading section 1 are formed at a high density. The vertical thin line image area herein means an area in which vertical lines extending parallel to each other in the sub-scanning direction of the reading section 1 are formed at a high density.

For the judgment, the area separating section 38 determines differences in image data between respective adjacent pairs of pixels aligning in a first direction (e.g., main scanning direction) in a second image block of a predetermined size containing the object pixel, and sums up the image data differences for all the pixels in the second image block for determination of a first direction density difference sum. Further, the area separating section 38 determines differences in image data between respective adjacent pairs of pixels aligning in a second direction (e.g., sub-scanning direction) orthogonal to the first direction in the second image block, and sums up the image data differences for all the pixels in the second image block for determination of a second direction density difference sum.

Figure 5:
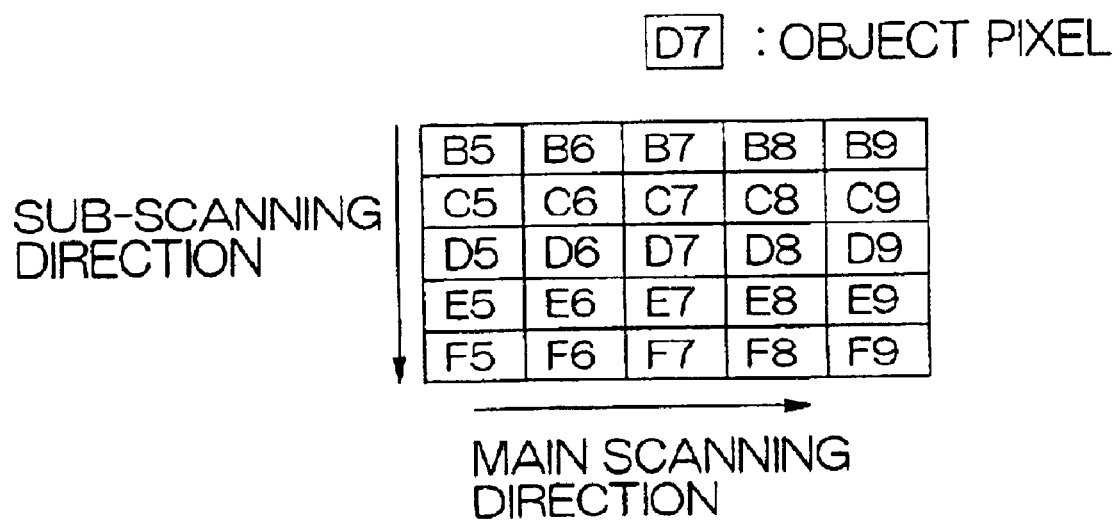
FIG. 5 is a diagram illustrating a second image block (5×5 pixel matrix) to be employed for extraction of pixels in a thin line image area.

More specifically, the second image block is a 5 (pixels)×5 (lines) matrix consisting of pixels B5 to B9, C5 to C9, D5 to D9, E5 to E9 and F5 to F9 retained in a proper buffer memory with the object pixel D7 located at the center thereof as shown in FIG. 5. A main scanning direction density difference sum H_SUM and a sub-scanning direction density difference sum V_SUM are calculated as the first direction density difference sum and as the second direction density difference sum from the following expressions (5) and (6), respectively (Step S3 in FIG. 3).

$$H\_SUM = |B5 - B6| + |B6 - B7| + |B7 - B8| + |B8 - B9| + |C5 - C6| + \quad (5)$$
$$|C6 - C7| + |C7 - C8| + |C8 - C9| + |D5 - D6| + |D6 - D7| +$$
$$|D7 - D8| + |D8 - D9| + |E5 - E6| + |E6 - E7| + |E7 - E8| +$$
$$|E8 - E9| + |F5 - F6| + |F6 - F7| + |F7 - F8| + |F8 - F9|$$

$$V\_SUM = |B5 - C5| + |C5 - D5| + |D5 - E5| + |E5 - F5| + |B6 - C6| + \quad (6)$$
$$|C6 - D6| + |D6 - E6| + |E6 - F6| + |B7 - C7| + |C7 - D7| +$$
$$|D7 - E7| + |E7 - F7| + |B8 - C8| + |C8 - D8| + |D8 - E8| +$$
$$|E8 - F8| + |B9 - C9| + |C9 - D9| + |D9 - E9| + |E9 - F9|$$

Subsequently, the area separating section 38 reads out a judgment threshold TH (AV) (photograph image area judgment threshold) defined as a function of the average value AV determined in Step S1 with reference to a judgment threshold table 40 (see FIG. 2). The sum TOTAL_SUM of the image data differences in the 13×7 pixel matrix is compared with the judgment threshold TH (AV) thus read out (Step S4). If the sum TOTAL_SUM of the image data differences is not smaller than the judgment threshold TH (AV) (NO in Step S4), it is judged that the object pixel is a constituent pixel of an image belonging to any of the image areas other than the photograph image area (Step S7). Therefore, the area separating section 38 outputs an area separation signal (e.g., a 1-bit signal having a value of 0) indicative of this judgment.

On the other hand, if the sum TOTAL_SUM of the image data differences is smaller than the judgment threshold TH (AV) (YES in Step S4), it is temporarily judged that the object pixel D7 belongs to the photograph image area. The validity of the judgment is judged again in Steps S5 and S6 which will be described later.

Figure 6:
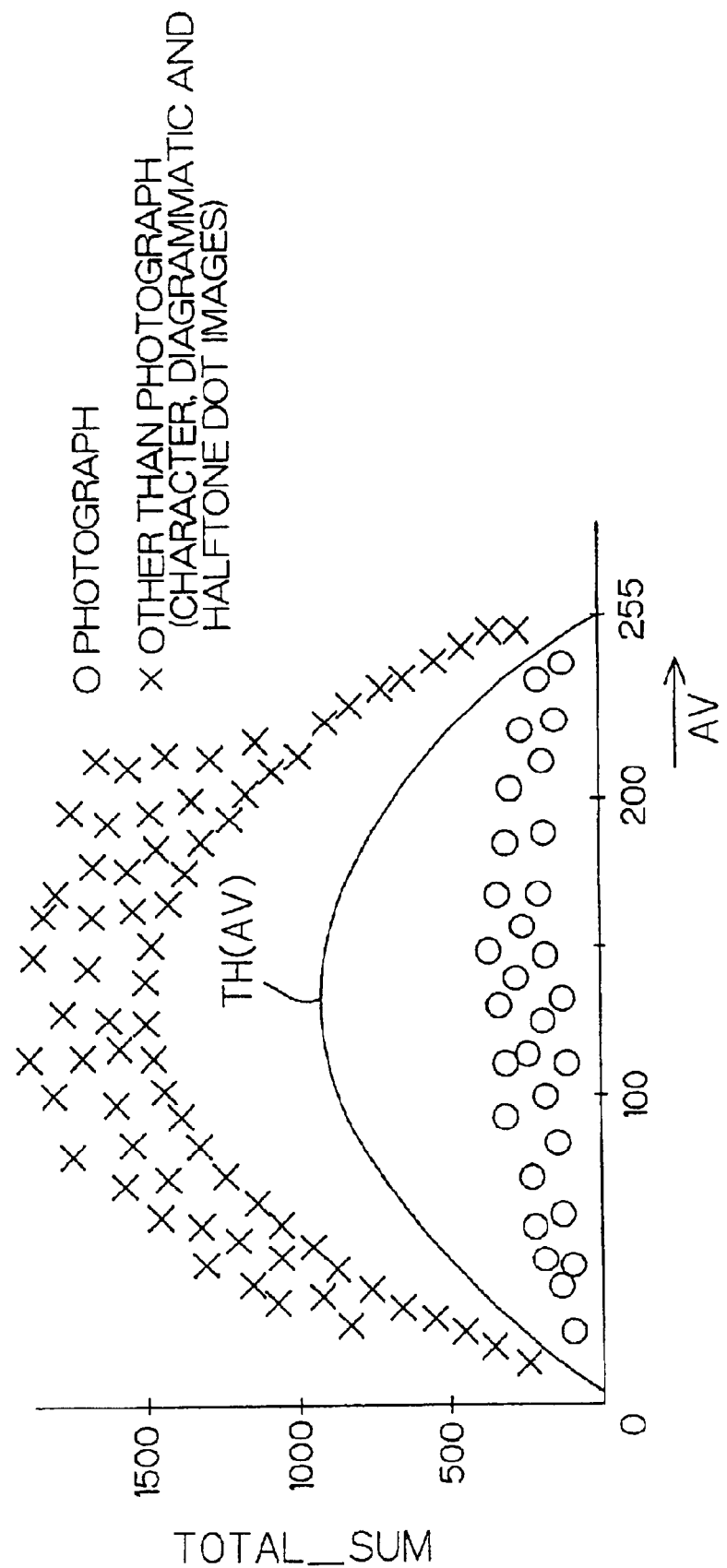
FIG. 6 is a graph for explaining how to determine a threshold TH (AV) to be employed for discrimination of a photograph image area with respect to an average value AV of image data of pixels within the first image block.

FIG. 6 is a graph for explaining how to determine the threshold TH (AV) for the average value AV. FIG. 6 illustrates a relationship between the average value AV and the sum TOTAL_SUM of the image data differences. An exemplary setting of the threshold TH (AV) for the average value AV is represented by a solid line. Plots indicative of a relationship between the average value AV and the sum TOTAL_SUM of the image data differences for the photograph image area are denoted by a symbol "○", while plots indicative of a relationship between the average value AV and the sum TOTAL_SUM of the image data differences for the image areas other than the photograph image area (the character image area, the diagrammatic image area and the lower-line-frequency halftone dot image area) are denoted by a symbol "X".

As can be understood from FIG. 6, the threshold TH (AV) is set between a distribution region of the plots ○ and a distribution region of the plots X. Therefor, the object pixel is judged to belong to the photograph image area if the sum TOTAL_SUM of the image data differences is smaller than the threshold TH (AV). On the other hand, the object pixel is judged to belong to any of the image areas other than the photograph image area if the sum TOTAL_SUM of the image data differences is not smaller than the threshold TH (AV) determined on the basis of the average value AV.

Referring again to FIG. 3, the area separating section 38 determines a magnitude relationship between the main scanning direction density difference sum H_SUM and the sub-scanning direction density difference sum V_SUM each determined for the 5×5 pixel matrix of the second image block through the processes in Steps S5 and S6, and judges whether or not the object pixel D7 belongs to the thin line image area on the basis of the result of the determination of the magnitude relationship. If the object pixel is judged to belong to the thin line image area, the area separating section 38 judges that the object pixel D7 does not belong to the photograph image area, and generates an area separation signal "0" indicative of this judgment.

Figure 7:
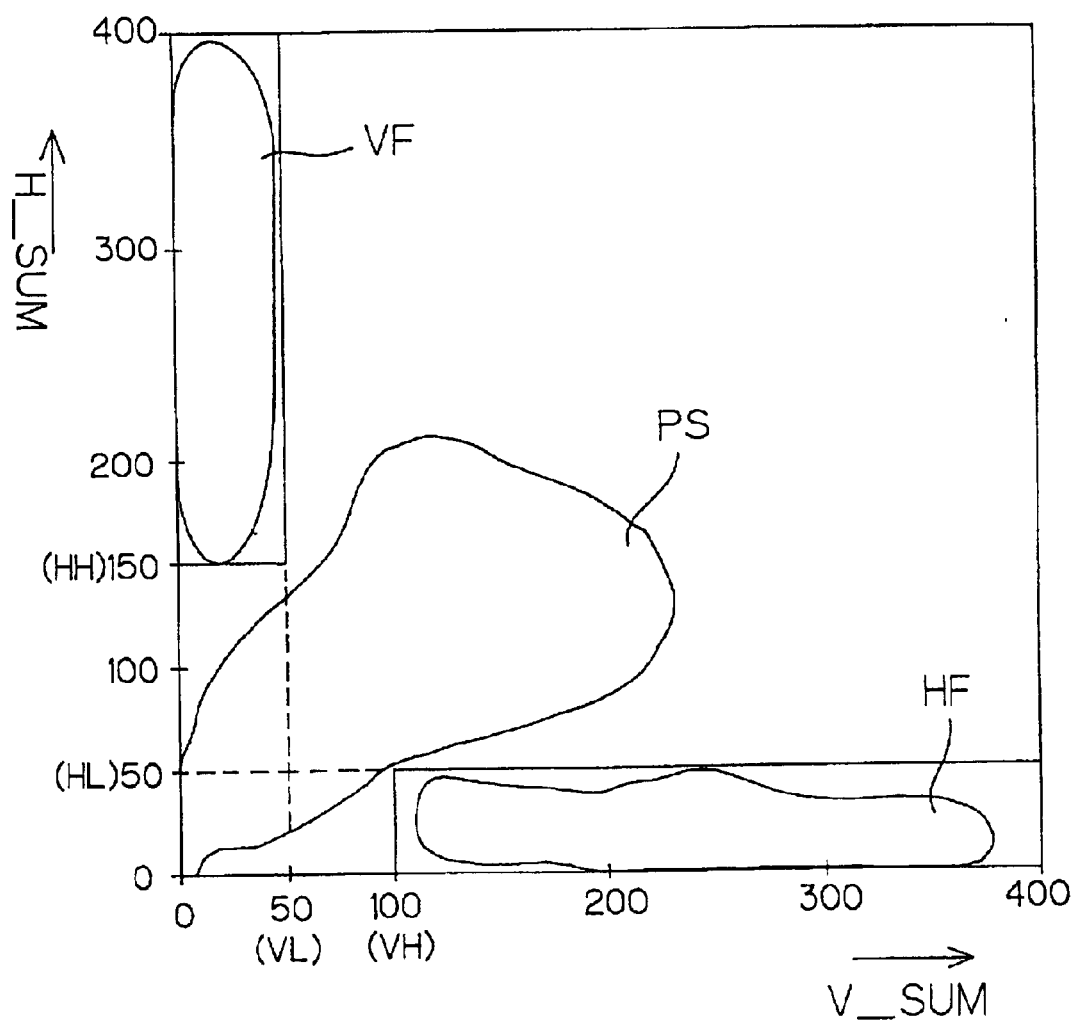
FIG. 7 is a diagram illustrating distributions of plots indicative of a relationship between a main scanning direction density difference sum H_SUM and a sub-scanning direction density difference sum V_SUM for the second image block.

More specifically, two thresholds HL and HH (HH>HL) are defined for the main scanning direction density difference sum H_SUM and, similarly, two thresholds VL and VH (VH>VL) are defined for the sub-scanning direction density difference sum V_SUM as shown in FIG. 7. For example, the thresholds HL, HH; VL, VH are defined as follows:

$HL$=50 $HH$=150

$VL$=50 $VH$=100

In a plane with the sub-scanning direction density difference sum V_SUM and the main scanning direction density difference sum H_SUM being plotted as abscissa and ordinate, respectively, as shown in FIG. 7, pixels constituting a horizontal thin line image area in which thin lines each extending horizontally (in the main scanning direction) are present at a high density are mostly plotted in a region HF where the sub-scanning direction density difference sum V_SUM is relatively great and the main-scanning direction density difference sum H_SUM is relatively small. Pixels belonging to a vertical thin line image area in which thin lines each extending vertically (in the sub-scanning direction) are present at a high density are mostly plotted in a region VF where the sub-scanning direction density difference sum V_SUM is relatively small and the main-scanning direction density difference sum H_SUM is relatively great. Pixels in an original photograph image and a halftone dot image to be regarded as belonging to the photograph image area are plotted in a central region PS of the V_SUM-H_SUM plane.

In this embodiment, if a condition that the main scanning direction density difference sum H_SUM for the object pixel is not smaller than the threshold HH and the sub-scanning direction density difference sum V_SUM is not greater than VL is satisfied (YES in Step S5 in FIG. 3), the area separating section 38 judges that the object pixel belongs to the thin line image area (in this case, the vertical thin line image area). That is, the area separating section 38 judges that the object pixel does not belong to the photograph image area, and generates an area separation signal "0" indicative of this judgment (Step S7).

If a condition that the main scanning direction density difference sum H_SUM for the object pixel is not greater than the threshold HL and the sub-scanning direction density difference sum V_SUM is not smaller than VH is satisfied (YES in Step S6), the area separating section 38 judges that the object pixel belongs to the thin line image area (in this case, the horizontal thin line image area). That is, the area separating section 38 judges that the object pixel does not belong to the photograph image area, and generates an area separation signal "0" indicative of this judgment (Step S7).

If the judgments in Steps S5 and S6 are both negative (i.e., in the case where the main scanning direction density difference sum H_SUM is not smaller than the threshold HH but the sub-scanning direction density difference sum V_SUM is greater than the threshold VL, in the case where the main scanning direction density difference sum H_SUM is not greater than the threshold HL but the sub-scanning direction density difference sum V_SUM is smaller than the threshold VH, or in the case where the main scanning direction density difference sum H_SUM is in the range between HL and HH), it is judged that the object pixel D7 does not belong to the thin line image area. That is, the judgment is made again to determine that the object pixel D7 belongs to the photograph image area (Step S8). In this case, the area separating section 38 generates, for example, a 1-bit area separation signal having a value ("1" in this embodiment) indicative of the attribution to the photograph image area.

Thus, the judgment based on the sum of the density differences between the pixels in the 13×7 pixel matrix (YES in Step S4) is re-confirmed.

Figure 8A:
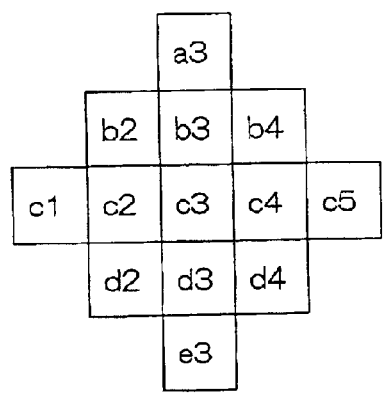
FIGS. 8(a) and 8(b) are diagrams for explaining the construction of a pre-separation filtering section.
Figure 8B:
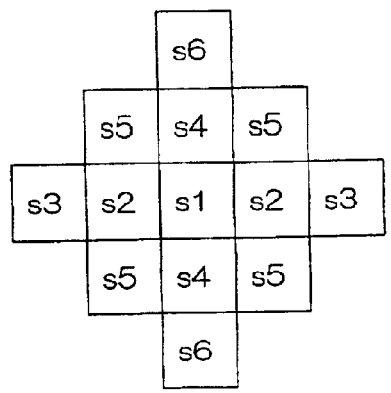

FIGS. 8(a) and 8(b) are diagrams for explaining the process to be performed by the pre-separation filtering section 39. The pre-separation filtering section 39 basically serves as integrator means for performing an integration filtering process. As shown in FIG. 8(a), image data of an object pixel c3 is smoothed with the use of image data of 13 pixels a3, b2 to b4, c1 to c5, d2 to d4 and e3 within a rhombus matrix (a square matrix oriented obliquely at 45 degrees with respect to the main scanning direction) with the object pixel c3 located at the center of the matrix.

Factors s1 to s6 by which the image data of the respective pixels within the matrix shown in FIG. 8(a) are to be multiplied are defined, for example, so as to be generally symmetric with respect to the object pixel c3 in the main scanning direction and the sub-scanning direction as shown in FIG. 8(b). The factors s1 to s6 may be set at the same value as shown below or at different values. For example, the values of the factors s1 to s6 may differently be weighted depending on the distance from the object pixel.

$$s1=s2=s3=s4=s5=s6=1$$

Where the factors s1 to s6 are set at a value as defined by the above expression, the image data of the object pixel c3 is converted into a value F(c3) defined by the following expression (7):

$$F(c3)=\{s1c3+s2(c2+c4)+s3(c1+c5)+s4(b3+d3)+s5(b2+b4+d2+d4)+s6(a3+e3)\}\div 13 \quad (7)$$

Figure 9:
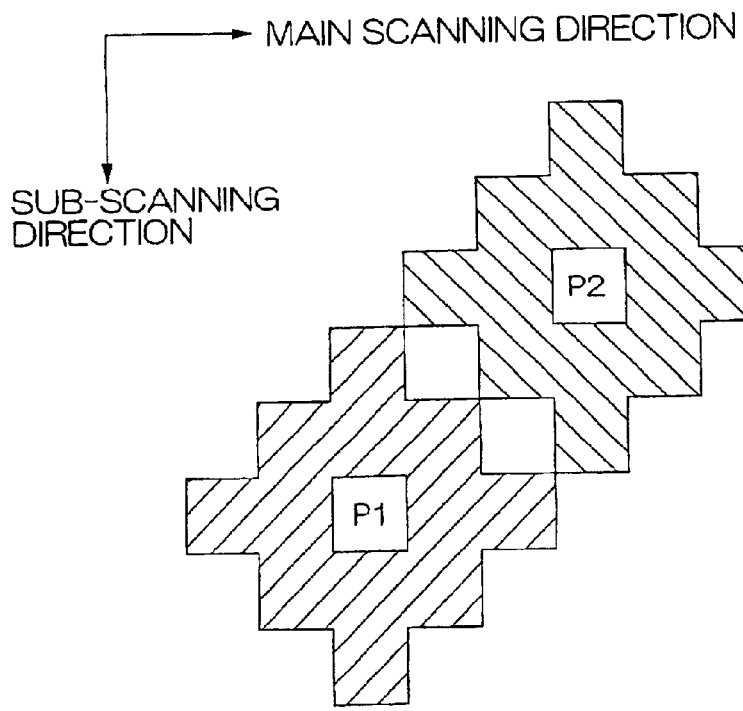
FIG. 9 is a diagram for explaining a process to be performed by the pre-separation filtering section.

In this embodiment, halftone dots are formed, for example, at a screen angle of 45 degrees with a line frequency of 141 lpi in the improved error diffusion process to be performed on the pixels belonging to the photograph image area by the halftoning section 37. On the other hand, the reading section 1 has a reading resolution of 600 dpi (dots per inch). Therefore, adjacent 141-lpi halftone dots are present at positions corresponding to pixels p1, p2, as shown in FIG. 9, which are apart from each other by 3 pixels in the main scanning direction and in the sub-scanning direction along a line extending obliquely at 45 degrees with respect to these directions.

In general, dots are more stably formed, as the line frequency of a halftone dot image to be subjected to the dotting process is closer to the line frequency to be employed for the dotting process. In the image outputting apparatus, the line frequency to be employed for the dotting process is generally set at the greatest possible line frequency which ensures the image reproducibility of the apparatus and, if the line frequency to be employed for the dotting process is higher than that line frequency, the stability of the dots to be reproduced through the dotting process is reduced. That is, even if an attempt is made to faithfully reproduce the halftone dots with a line frequency greater than the line frequency to be employed for the dotting process in the halftoning process in the image outputting apparatus, the dots cannot stably be formed. A recent trend is to process an image at 600 dpi, which may depend on the image outputting apparatus and the line frequency to be employed for the halftoning process. The dot stability can generally be ensured if a difference between the line frequency for the halftoning process and the line frequency of a thin line image in a document original is within ±50 lpi.

For the prevention of a moiré pattern, on the other hand, it is preferred that the line frequency for the dotting process in the halftoning process is not close to the line frequency of the halftone dot image of the document original to be subjected to the image processing. As these line frequencies are closer to each other, a more conspicuous moiré pattern is liable to occur. In general, virtually no moiré pattern occurs if the line frequency for the halftoning process is ±50 lpi apart from the line frequency of the image of the document original.

A higher-line-frequency image such as a photograph image is generally subjected to the dotting process. Therefore, a boundary line frequency to be employed for the area separation in the halftoning process is defined between the line frequency for the halftoning process (for the dotting process) and this line frequency plus 50 lpi (for example, at 175 lpi). An image area with a line frequency higher than the boundary line frequency is regarded as the photograph image area, and an image area with a line frequency not higher than the boundary line frequency is excluded from the photograph image area.

Where the line frequency of the halftone dot image of the document original is close to the line frequency of the halftone dot image to be formed through the improved error diffusion process in the halftoning section 37 with a line frequency difference there between being relatively small within ±50 lpi, there is a possibility that a so-called moiré pattern is formed in an outputted image. Therefore, pixels in a document original image with such a line frequency are preferably subjected not to the improved error diffusion process but to the ordinary error diffusion process employing the quantization thresholds each fixed at a predetermined value. On the other hand, a halftone dot image with a line frequency higher than the boundary line frequency defined between 141 lpi (the line frequency to be employed for the improved error diffusion process) and 141+50 lpi is regarded as a photograph image and subjected to the improved error diffusion process for proper gradation representation.

Therefore, the boundary line frequency is defined between the predetermined line frequency (141 lpi in this embodiment) to be employed for the improved error diffusion process and this line frequency plus 50 lpi (191 lpi in this embodiment). An image with a line frequency not lower than the boundary line frequency is judged to belong to the photograph image area, while an image with a line frequency lower than the boundary line frequency is judged to belong to any of the other image areas. The boundary line frequency is determined depending on the configuration of the pre-separation filtering section 39. More specifically, a line frequency possibly causing the interference is reduced to reduce the boundary line frequency, as the size of the matrix shown in FIG. 8(a) is increased. If the factors s1 to s6 in the matrix are differentiated (for example, with the factor at the center having the highest value), the boundary line frequency is increased. In this embodiment where the factors s1 to s6 are set at the same value with the matrix shown in FIG. 8(a), the boundary line frequency is about 175 lpi.

As shown in FIG. 9, the integration filter in the pre-separation filtering section 39 is configured so that image data of a 141-lpi halftone dot image in the document original subjected to the integration filtering process is free from an interference between halftone dots (halftone dots subjected to the smoothing process are diagonally shaded in FIG. 9). The integration filter is adapted to cause a proper interference between adjacent halftone dots in the case where the inputted image is a halftone dot image with a line frequency of not lower than 175 lpi. As a result, the area separating section 38 judges that the sum of the image data differences between the pixels in the 13×7 pixel matrix for the higher-line-frequency halftone dot image with a line frequency of not lower than 175 lpi is relatively small and, hence, the pixels in the higher-line-frequency halftone dot image belongs to the photograph image area.

It is noted that the first image block and the second image block are not necessarily required to be the 13×7 pixel matrix and the 5×5 pixel matrix, respectively.

That is, the size of the first image block is determined so that the distributions of the plots indicative of the relationship between the average value AV and the image data difference sum TOTAL_SUM in the first image block appear in the separate regions as shown in FIG. 6.

In this embodiment, the 13×7 pixel matrix is employed as the first image block as described above. This is because a reference is made to a region which assuredly contains a constituent halftone dot of a 65-lpi halftone dot image. An example of the 65-lpi halftone dot image is a photograph image printed on newspaper, and the minimum line frequency to be employed for ordinary printed matter is 65 lpi. Therefore, the minimum requirement for practical applications is to discriminate halftone dot image areas with a line frequency of not smaller than 65 lpi from the photograph image area.

Figure 10:
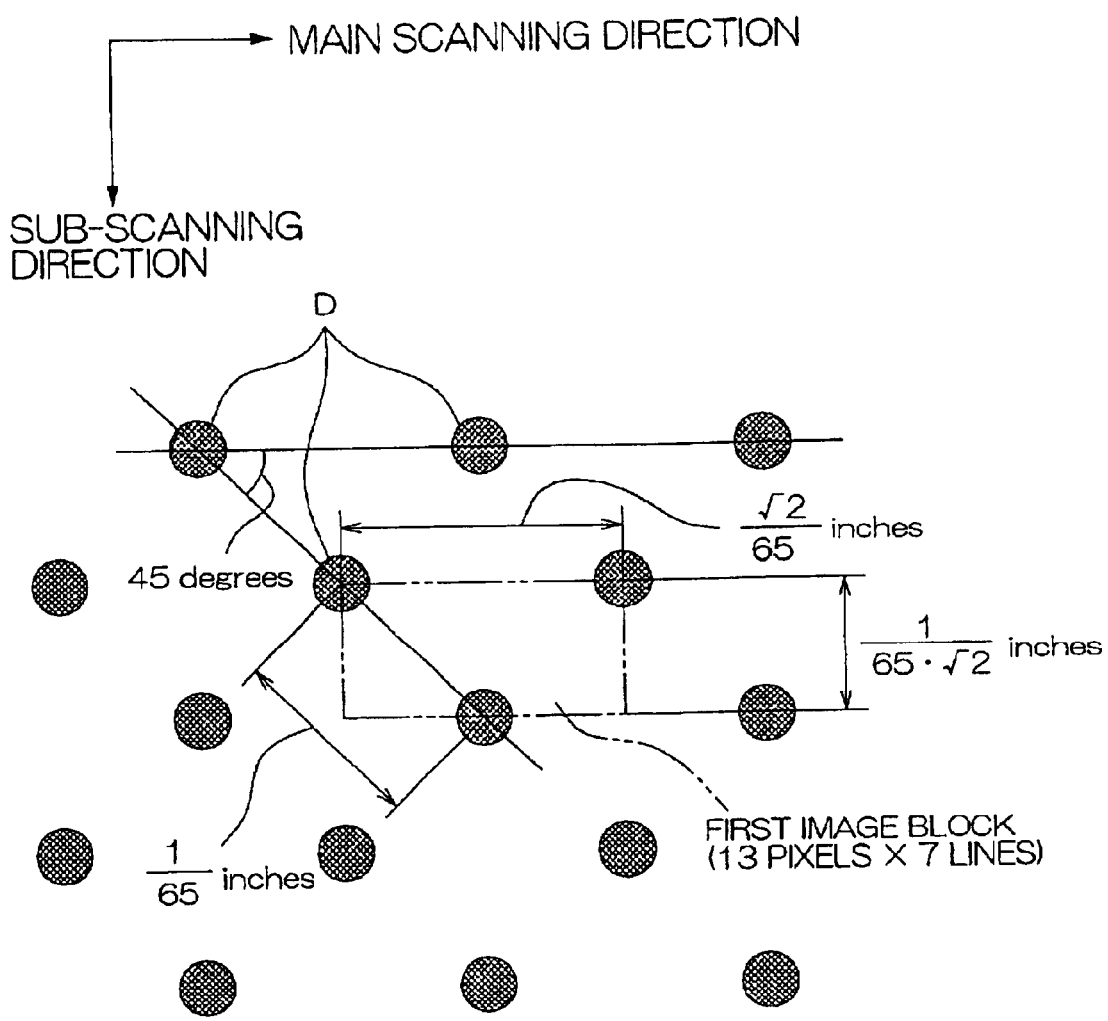
FIG. 10 is a diagram for explaining the size of a matrix of the first image block.

For this purpose, at least one constituent halftone dot of the 65-lpi halftone dot image should be present in the reference region (first image block). Where halftone dots D are present at a screen angle of 45 degrees as shown in FIG. 10, a distance between adjacent halftone dots D aligning in the main scanning direction is $\sqrt{2}/65$ inch, and a distance between adjacent dots D aligning in the sub-scanning direction is $1/(65 \cdot \sqrt{2})$ inch.

Where the reading section 1 has a reading resolution of 600 dpi, the distance between the adjacent dots D aligning in the main scanning direction corresponds to 13 pixels ($\approx 600 \times \sqrt{2}/65$), and the distance between the adjacent dots D aligning in the sub-scanning direction corresponds to 7 pixels ($\approx 6.53 = 600/(65 \cdot \sqrt{2})$). Therefore, a halftone dot image with a line frequency of not lower than 65 lpi can be discriminated from the photograph image area by setting the size of the first image block to the 13×7 pixel matrix as described above.

As can be understood from the forgoing, the size of the first image block depends on the line frequency of the halftone dot image to be separated and the reading resolution of the reading section 1, and the 13×7 pixel matrix is merely an example of the first image block.

In order to reduce the capacity of the buffer memory required for defining the first image block, the size of the first image block is preferably determined so that one halftone dot in a halftone dot image with the minimum line frequency to be separated is present in the reference matrix. Alternatively, the size of the first image block may be determined so that more than one halftone dot (the number of the halftone dots is not necessarily required to be an integer) is present in the first image block. For the discrimination of the halftone dot image with a line frequency of not lower than 65 lpi from the photograph image area, a matrix having a size greater than the 13×7 pixel matrix may be employed as the first image block.

Similarly, the size of the pixel matrix to be employed as the second image block is determined so that the distributions of the plots indicative of the relationship between the main scanning direction density difference sum H_SUM and the sub-scanning direction density difference sum V_SUM for the image to be regarded as belonging to the photograph image area and for the image in the thin line image area are present in separate regions in the distribution graph shown in FIG. 7. Therefore, the second image block may be a square pixel matrix smaller or greater than the 5×5 pixel matrix, a rectangular matrix with different numbers of pixels aligning in the main scanning direction and in the sub-scanning direction, or a matrix of any other configuration. For example, the 13×7 pixel matrix employed as the first image block may be employed as it is as the second image block, and TOTAL_DH and TOTAL_DV maybe employed instead of H_SUM and V_SUM, respectively.

Where the reference matrix has a greater size, however, there is a possibility that the judgment for the area separation is erroneously made, because pixels in each line are initially processed with reference to a smaller number of image data. In this connection, matrices of minimum necessary sizes are preferably employed as the first image block and the second image block.

Pixels located in opposite end portions with respect to the main scanning direction and the sub-scanning direction are insufficient to define the first image block or the second image block. Where the first pixel in each line is to be processed as the object pixel, for example, no pixel is present upstream of the object pixel in the main scanning direction. In such a case, image data of null pixels in the 13×7 pixel matrix or the 5×5 pixel matrix is regarded as "0" for the judgment for the area separation.

Figure 11:
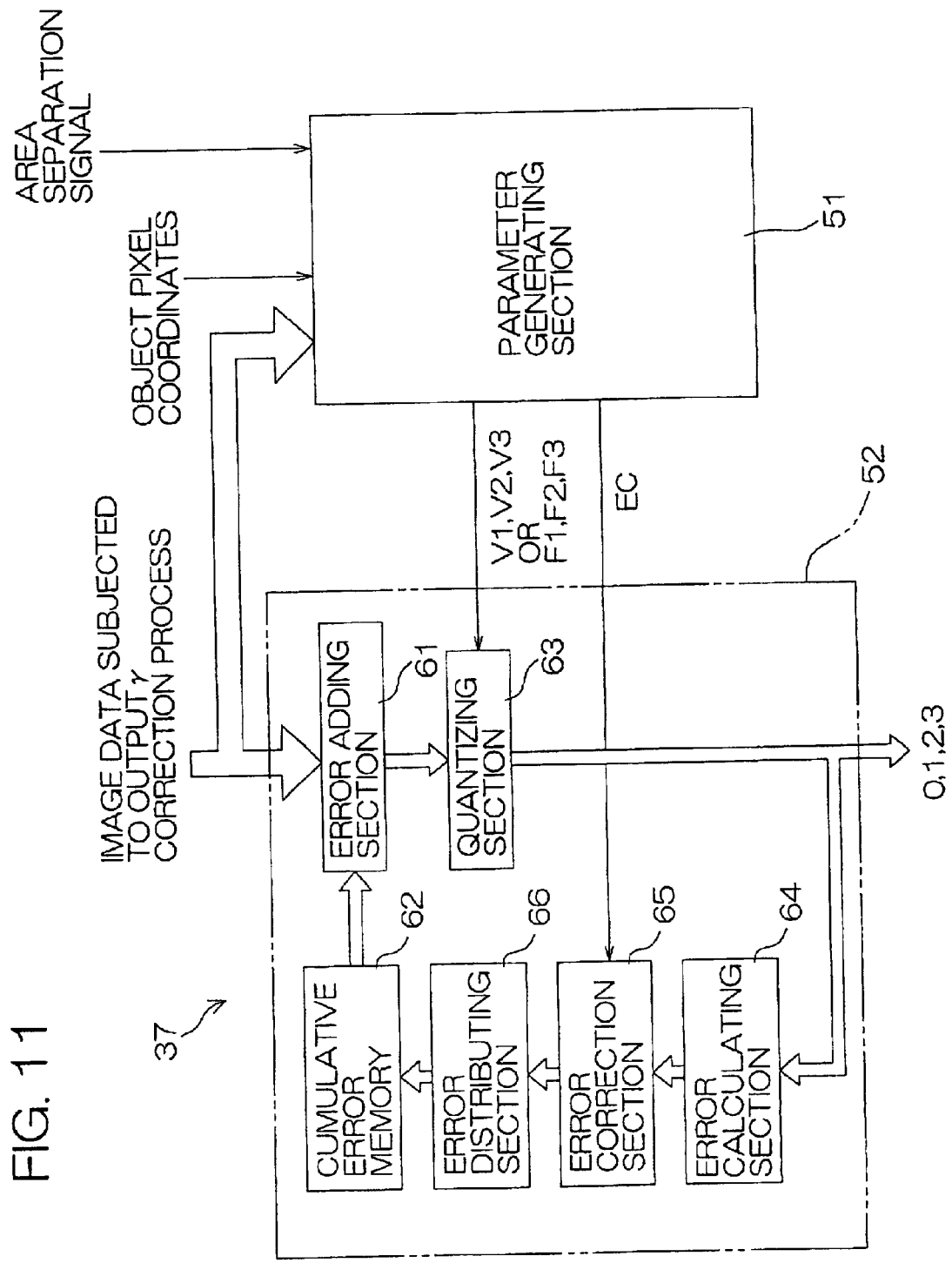
FIG. 11 is a block diagram for explaining the functional configuration of a halftoning section.

FIG. 11 is a block diagram for explaining the functional configuration of the halftoning section 37. The halftoning section 37 includes a parameter generating section 51 for generating parameters for the error diffusion process on the basis of the area separation signal applied from the area separating section 38, the coordinates of the object pixel and the image data of the object pixel (the image data subjected to the output γ correction process in this embodiment). The halftoning section 37 further includes an error diffusion processing section 52 for performing an error diffusion computation on the inputted image data on the basis of the image data applied from the output γ correction section 36 and the various parameters applied from the parameter generating section 51.

The parameter generating section 51 has a construction (which will be described later) adapted to generate thresholds V1, V2 and V3, or F1, F2 and F3 to be employed for the quantization of the inputted image data (for the two-level or four-level quantization of the inputted image data in this embodiment) and an error correction value EC to be employed for the correction of the error generated when the image data is quantized (quantization error), and apply the thresholds and the error correction value to the error diffusion processing section 52.

Figure 12B:
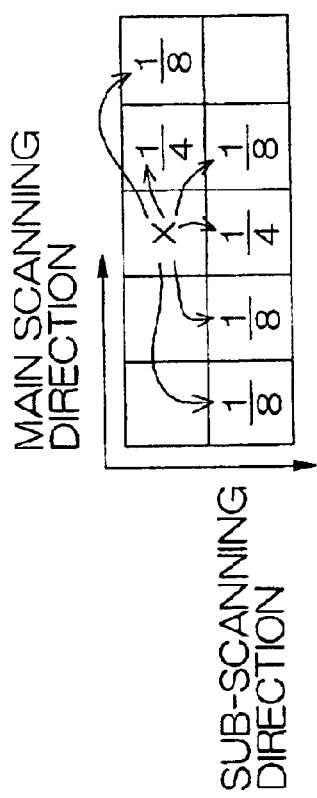
FIGS. 12(a) and 12(b) are diagrams for explaining accumulation and distribution of quantization errors.
Figure 12A:
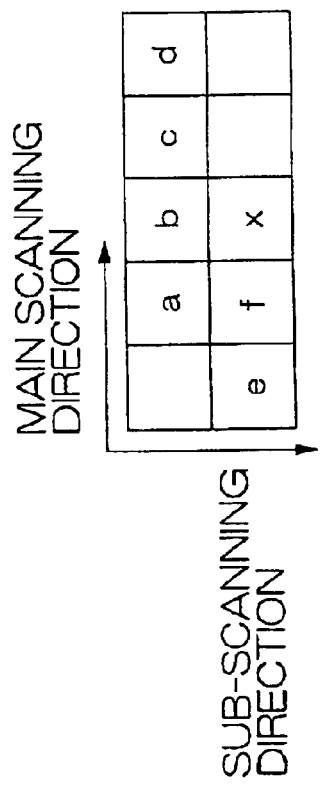

The error diffusion processing section 52 includes an error adding section 61 for adding a cumulative error stored in a cumulative error memory 62 to the inputted image data. The cumulative error memory 62 cumulatively stores therein errors distributed to the object pixel from peripheral pixels subjected to the quantization process. As shown in FIG. 12(a), errors from quantized peripheral pixels a, b, c, d, e and f, for example, are each multiplied by a predetermined error diffusion factor (e.g., ¼ or ⅛) for an object pixel X, and summed up. In this case, the cumulative error is calculated, for example, from the following expression:

$$\text{Cumulative error} = (⅛) \times a + (¼) \times b + (⅛) \times c + (⅛) \times d + (⅛) \times e + (¼) \times f \quad (8)$$

Cumulative errors are stored for the respective pixels in the cumulative error memory 62, and the cumulative error for the object pixel to be subjected to the error diffusion process is read out of the cumulative error memory 62 and added to the image data of the object pixel by the error adding section 61.

The error diffusion processing section 52 further includes a quantizing section 63 for quantizing the image data subjected to the error adding process on the basis of the three quantization thresholds V1, V2 and V3, or F1, F2 and F3 applied from the parameter generating section 51 for the ordinary error diffusion process or for the improved error diffusion process. In this embodiment, the quantizing section 63 converts the image data into 2-bit data representing one of four values (i.e., 0, 1, 2, 3).

The quantization thresholds V1, V2, V3 are variable thresholds which are defined to be periodically two-dimensionally variable in an image plane and satisfy a relationship of $V1 \leq V2 \leq V3$. The quantization thresholds F1, F2, F3 are fixed thresholds which are defined to satisfy a relationship of $F1 \leq F2 \leq F3$ (particularly, F1=F2=F3 in this embodiment). The parameter generating section 51 generates the variable thresholds V, V2, V3 or the fixed thresholds F1, F2, F3. Upon reception of the quantization thresholds, the quantizing section 63 performs the following conditional judgment steps I, II, III, IV in this order on the basis of the three quantization thresholds V, V2 and V3, or F1, F2 and F3 to quantize the image data into 0, 1, 2 or 3 (four-level quantization) If any of the conditions is first satisfied when the conditional judgment steps I to IV are performed in sequence, a value (output data) is determined for the quantization without performing the subsequent conditional step.

I. If (Image data subjected to the error adding process)>V3 or F3, the image data of the object pixel is quantized into "3".
II. If V3 or $F3 \geq$ (Image data subjected to the error adding process)>V2 or F2, the image data of the object pixel is quantized into "2".
III. If V2 or $F2 \geq$ (Image data subjected to the error adding process)>V1 or F1, the image data of the object pixel is quantized into "1".
IV. If V1 or $F1 \geq$ (Image data subjected to the error adding process), the image data of the object pixel is quantized into "0". . . . (9)

Where the quantization thresholds V1, V2 and V3, or F1, F2 and F3 have different values, the image data of the object pixel is quantized on a four-level basis into 0, 1, 2 or 3.

Where the quantization thresholds V1, V2 and V3, or F1, F2 and F3 have the same value, the image data of the object pixel is quantized on a two-level basis into 0 or 3 by performing the conditional judgment steps I–IV in sequence.

An error generated as the result of the quantization process performed by the quantizing section 63 is determined by an error calculating section 64. Where the density gradation of the inputted image data is represented on the basis of 256 gradation levels from 0 to 255, the error calculating section 64 calculates the error on the basis of the output data (the result of the quantization) from the following expressions:

If the output data is 3,

Error=(Image data subjected to error adding process)–255 (Maximum gradation level);

If the output data is 2,

Error=(Image data subjected to error adding process)–170 (Second intermediate gradation level);

If the output data is 1,

Error=(Image data subjected to error adding process)–85 (First intermediate gradation level);

If the output data is 0,

Error=(Image data subjected to error adding process)–0 (Minimum gradation level) (10)

The output data "3" corresponds to a black pixel of the maximum gradation level "255". The output data "0" corresponds to a white pixel of the minimum gradation level "0". The output data "1" and "2" correspond to gray pixels of the first intermediate gradation level "85" and the second intermediate gradation level "170", respectively. The first intermediate gradation level and the second intermediate gradation level are set at the gradation levels which equally divide the full gradation range from 0 to 255 into three ranges.

The error calculated by the error calculating section 64 is subjected to a correction process to be performed by an error correction section 65. The correction process is performed by subtracting the error correction value EC applied from the parameter generating section 51 from the error determined by the error calculating section 64 as shown in the following expression (11). The corrected error is subjected to a distribution process to be performed by an error distributing section 66. A cumulative error obtained as the result of the distribution process is stored in the cumulative error memory 62.

Corrected error=(Error calculated from expression (10))–EC (11)

The process to be performed by the error distributing section 66 is reverse to the error accumulating process shown in FIG. 12(a). That is, the error generated for the object pixel X is multiplied by a predetermined error diffusion factor (¼ or ⅛ in this embodiment) as shown in FIG. 12(b), and distributed to peripheral pixels yet to be subjected to the two-level quantization process around the object pixel X.

Figure 13:
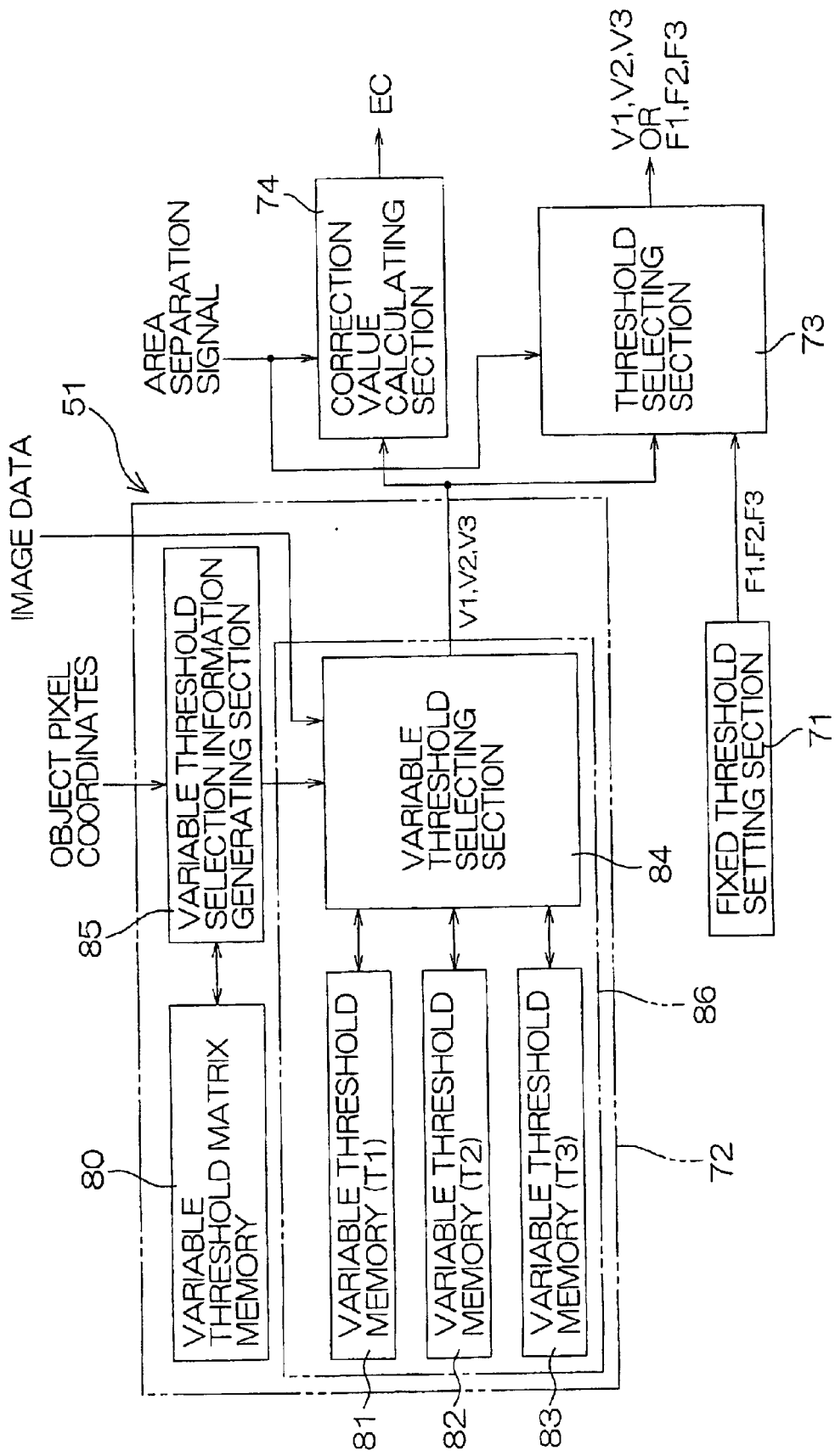
FIG. 13 is a block diagram for explaining the functional configuration of a parameter generating section.

FIG. 13 is a block diagram for explaining the functional configuration of the parameter generating section 51. On the basis of the area separation signal applied from the area separating section 38, the parameter generating section 51 generates parameters for the ordinary error diffusion process employing the quantization thresholds each fixed at a predetermined value and parameters for the improved error diffusion process employing the quantization thresholds periodically two-dimensionally variable in the image plane. More specifically, where the area separation signal has a value of 1 which indicates that the object pixel belongs to the photograph image area, the parameters for the improved error diffusion process are generated. Where the area separation signal has a value of 0 which indicates that the object pixel belongs to any of the image areas other than the photograph image area, the parameters for the ordinary error diffusion process are generated.

For this function, the parameter generating section 51 includes a fixed threshold setting section 71 for generating the fixed thresholds F1, F2, F3 for the ordinary error diffusion process, a variable threshold setting section 72 for generating the variable thresholds V1, V2, V3 for the improved error diffusion process, a threshold selecting section 73 for selecting the fixed thresholds F1, F2, F3 or the variable thresholds V1, V2, V3 on the basis of the area separation signal, and a correction value calculating section 74 for calculating the error correction value EC for the correction of the error and applying the error correction value EC to the error diffusion processing section 52.

The correction value calculating section 74 calculates the error correction value EC on the basis of the area separation signal and the variable thresholds V, V2, V3 applied from the variable threshold setting section 72. More specifically, where the area separation signal has a value of 0 and the object pixel belongs to any of the image areas other than the photograph image area, the error correction value EC is set at a fixed value (0 in this embodiment). On the other hand, where the area separation signal has a value of 1, the error correction value EC is variably set in accordance with the values of the variable thresholds V1, V2, V3 applied from the variable threshold setting section 72.

In this embodiment, the fixed thresholds F1, F2, F3 generated by the fixed threshold setting section 71 are set at the same value (e.g., 127 which is a middle value between 0 and 255). When the fixed thresholds F1, F2, F3 are applied to the error diffusion processing section 52, the quantizing section 63 of the error diffusion processing section 52 quantizes the inputted image data on a two-level basis into 0 or 3.

The variable threshold setting section 72 includes a variable threshold matrix memory 80 storing therein a variable threshold matrix for setting the quantization thresholds periodically two-dimensionally variable in the image plane, a variable threshold selection information generating section 85 for determining the position of the object pixel within the variable threshold matrix on the basis of the coordinates of the object pixel and generating a matrix element value at that position in the variable threshold matrix as variable threshold selection information, and a variable threshold generating section 86 for generating the variable thresholds V1, V2, V3 on the basis of the variable threshold selection information and the value of the image data of the object pixel.

The variable threshold generating section 86 includes a variable threshold memory 81 storing therein a variable threshold table T1 for the generation of the variable threshold V1, a variable threshold memory 82 storing therein a variable threshold table T2 for the generation of the variable threshold V2, and a variable threshold memory 83 storing therein a variable threshold table T3 for the generation of the variable threshold V3. The variable threshold generating section 86 further includes a variable threshold selecting section 84 for selecting the variable thresholds V1, V2 and V3 from the variable threshold memories 81, 82 and 83, respectively, on the basis of the variable threshold selection information and the value of the image data of the object pixel and applying the selected variable thresholds to the threshold selecting section 73.

Where the area separation signal has a value of 1 indicative of the attribution to the photograph image area, the threshold selecting section 73 selects the variable thresholds V1, V2, V3 and applies the variable thresholds to the error diffusion processing section 52. Where the area separation signal has a value of 0 indicative of the attribution to any of the image areas other than the photograph image area, the threshold selecting section 73 applies the fixed thresholds F1, F2, F3 set by the fixed threshold setting section 71 to the error diffusion processing section 52.

Figures 14A, 14B:
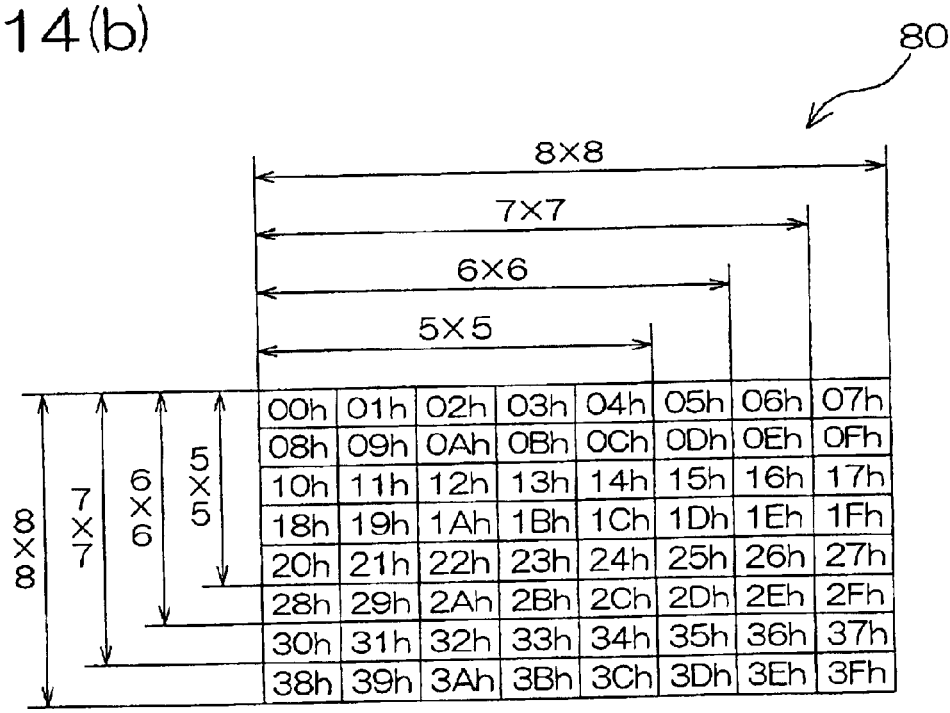
FIG. 14(a) is a diagram illustrating a variable threshold matrix stored in a variable threshold matrix memory.
FIG. 14(b) is a diagram illustrating addresses of the variable threshold matrix memory corresponding to respective matrix positions in the variable threshold matrix.

FIG. 14(a) is a diagram illustrating an example of the variable threshold matrix stored in the variable threshold matrix memory 80, and FIG. 14(b) is a diagram illustrating addresses of the variable threshold matrix memory 80 corresponding to respective matrix positions in the variable threshold matrix. FIG. 14(a) illustrates the variable threshold matrix prepared in consideration of the four-level quantization of the image data, and the values of the respective matrix elements are each set at 0, 1, 2 or 3. Relatively small quantization thresholds are set for a pixel corresponding to a smaller matrix element value in the threshold matrix. Relatively great quantization thresholds are set for a pixel corresponding to a greater matrix element value in the threshold matrix. Therefore, if the object pixel corresponds to a smaller matrix element value, there is a high possibility that the object pixel is quantized into a value indicative of a high density pixel (black pixel). If the object pixel corresponds to a greater matrix element value, there is a high possibility that the object pixel is quantized into a value indicative of a low density pixel (white pixel).

The quantization process to be performed on the image by employing the variable thresholds V1, V2, V3 can be understood by imagining that variable threshold matrices as shown in FIG. 14(a) are two-dimensionally tiled over the image plane. In this case, the quantization thresholds to be employed by the quantizing section 63 (see FIG. 11) are periodically variable in the main scanning direction and the sub-scanning direction (i.e., two-dimensionally). Therefore, dots (halftone dots) periodically appear in an image obtained through the quantization process and, as a result, the dotting process can be achieved.

In FIG. 14(a), a small 3×3 pixel matrix with a matrix element of a value "0" (corresponding to a saddle point in a quantization threshold variation cycle) surrounded by matrix elements of a value "1" and a small 3×3 pixel matrix with a matrix element of a value "3" (corresponding to a peak point in the quantization threshold variation cycle) surrounded by matrix elements of a value "2" are alternately arranged in the main scanning direction and the sub-scanning direction. Thus, halftone dots can be formed at a screen angle of 45 degrees. Where the reading section 1 has a reading resolution of 600 dpi, the halftone dot image has a line frequency of 141 lpi.

Although the variable threshold matrix shown in FIG. 14(a) is constituted by 6×6 pixels, the size of the matrix maybe 5×5 pixels, 7×7 pixels or the like. Where the size of an n×n pixel matrix is defined as "n", for example, the position of the object pixel in the variable threshold matrix (i.e., the address of the object pixel in the variable threshold matrix memory 80) can be calculated from the following expression on the basis of the coordinates of the object pixel (main scanning coordinate, sub-scanning coordinate).

Address=[Remainder of (Main scanning coordinate÷n)+(Remainder of (Sub-scanning coordinate÷n) ]×8

In this expression, it is assumed that the maximum matrix size of the variable threshold matrix is 8 (see FIG. 14(b)), and the variable threshold matrix memory 80 may be addressed in a different manner depending on the configuration thereof.

The variable threshold selection information generating section 85 reads a matrix element value from the variable threshold matrix on the basis of the address calculated from the expression (12) with the coordinates of the object pixel, and applies the matrix element value as the variable threshold selection information to the variable threshold selecting section 84. The variable threshold selecting section 84 properly reads the variable thresholds V1, V2 and V3 from the variable threshold tables T1, T2 and T3 of the variable threshold memories 81, 82 and 83, respectively, on the basis of the variable threshold selection information applied thereto.

FIG. 15 is a diagram illustrating exemplary settings of the variable threshold tables T1, T2 and T3. The variable thresholds V1, V2, V3 are defined so as to satisfy the relationship V1≦V2≦V3.

More specifically, the variable thresholds V1(0) V2(0), V3(0) for a matrix element value of 0 in the variable threshold matrix are in principle determined so as to satisfy a relationship of V1(0)=V2(0)=V3(0) in this embodiment. Similarly, the variable thresholds V1, V2, V3 for matrix element values of 2 and 3 in the variable threshold matrix are in principle determined so as to satisfy relationships of V1(2)=V2(2)=V3(2) and V1(3)=V2(3)=V3(3).

The variable thresholds V1(1), V2(1), V3(1) for a specific matrix element value of 1 in the variable threshold matrix are in principle determined so as to satisfy a relationship of V1(1)<V2(1)<V3(1).

In principle, a smaller value is assigned to each of the variable thresholds V1, V2, V3, as the matrix element value in the variable threshold matrix is smaller. That is, the variable thresholds V1, V2, V3 are determined so as to satisfy the following expressions:

$$V1(0)<V1(1)<V1(2)<V1(3)$$

$$V2(0)<V2(1)<V2(2)<V2(3)$$

$$V3(0)<V3(1)<V3(2)<V3(3) \quad (12)$$

Where the matrix element value in the variable threshold matrix is 0, 2 or 3 when the variable thresholds V1, V2, V3 are applied as the quantization thresholds to the quantizing section 63 of the error diffusion processing section 52, the quantizing section 63 quantizes the inputted image data on a two-level basis into 0 or 3, because the variable thresholds V1, V2, V3 have the same value. On the other hand, the variable thresholds V1, V2, V3 have different values for the object pixel corresponding to the matrix element value "1" in the variable threshold matrix and, therefore, the quantizing section quantizes the inputted image on a four-level basis into 0, 1, 2 or 3.

As can be understood in view of image data values in the range between 0 and 15 in FIG. 15, the variable thresholds V1, V2, V3 are variably set depending on the value (density level) of the image data of the object pixel in this embodiment. More specifically, where the image data has a value in the range between 1 and 7, the variable thresholds V1, V2, V3 are fixedly set at a middle gradation level "127" between 0 and 255 regardless of the matrix element value in the variable threshold matrix. Thus, the ordinary error diffusion process without periodic variation of the quantization thresholds is performed, so that the quantizing section 63 of the error diffusion processing section 52 quantizes the inputted image data on a two-level basis into 0 or 3.

Where the image data of the object pixel has a value in the range between 8 and 15, the variable thresholds V1, V2, V3 are set so that variations in the variable thresholds for the matrix element values in the variable threshold matrix are smaller than in the case where the image data has a value of 16 or greater.

By thus nullifying or reducing the variations in the thresholds for the matrix element values in the variable threshold matrix, the dot concentration in a very low density image area can be suppressed or eliminated. Thus, a low density image area in a photograph image can be reproduced with excellent gradation representation with no conspicuous big dot in the output image. At the same time, textures can be suppressed which may otherwise occur due to the variations in the quantization thresholds.

The variable threshold selecting section 84 reads out the variable thresholds V1, V2, V3 from the variable threshold memories 81, 82, 83, respectively, on the basis of the image data of the object pixel and the matrix element value for the object pixel in the variable threshold matrix (variable threshold selection information), and applies these variable thresholds to the threshold selecting section 73.

Where the area separation signal has a value of 0 and the fixed thresholds F1, F2, F3 set by the fixed threshold setting section 71 are employed, the correction value calculating section 74 sets the error correction value EC at 0. On the other hand, where the area separation signal has a value of 1 indicative of the attribution to the photograph image area, the correction value calculating section 74 obtains the variable thresholds V1, V2, V3 from the threshold selecting section 73, and calculates the error correction value EC from the following expression:

$$\text{Error correction value}=(V1+V2+V3)\div 3-127 \quad (13)$$

That is, a deviation of the average of the variable thresholds V1, V2 and V3 from the middle gradation level "127" is determined as the error correction value EC, which is applied to the error correction section 65. The error correction section 65 subtracts the error correction value EC from the error calculated by the error calculating section 64 for calculation of the corrected error (see the expression (11)).

Where the variable thresholds V1, V2, V3 periodically two-dimensionally variable in the image plane are employed, the correction is made so that the error to be distributed to the peripheral pixels is not influenced by the variations in the quantization thresholds. This correction process is actually intended to change reference values for the calculation of the error in accordance with the variations in the quantization thresholds.

That is, the minimum gradation level"0", the first middle gradation level "85", the second middle gradation level "170" and the maximum gradation level "255" in the expression (10) are the reference values for the calculation of the error. The process to be performed in accordance with the expression (11) for the correction of the error is actually intended to correct the reference values "0", "85", "170" and "255" for the error calculation with the error correction value EC to determine the quantization error with the use of the corrected calculation reference values "0-EC", "85-EC", "170-EC" and "255-EC". As can be understood from the expression (13), the error correction value EC periodically varies with the periodic variation of the variable thresholds V1, V2, V3, so that the corrected calculation reference values periodically vary in phase with the variable thresholds V1, V2, V3. Thus, distribution of a greater error to the peripheral pixels can be prevented, so that dots can effectively be concentrated for formation of a halftone dot.

Figure 16:
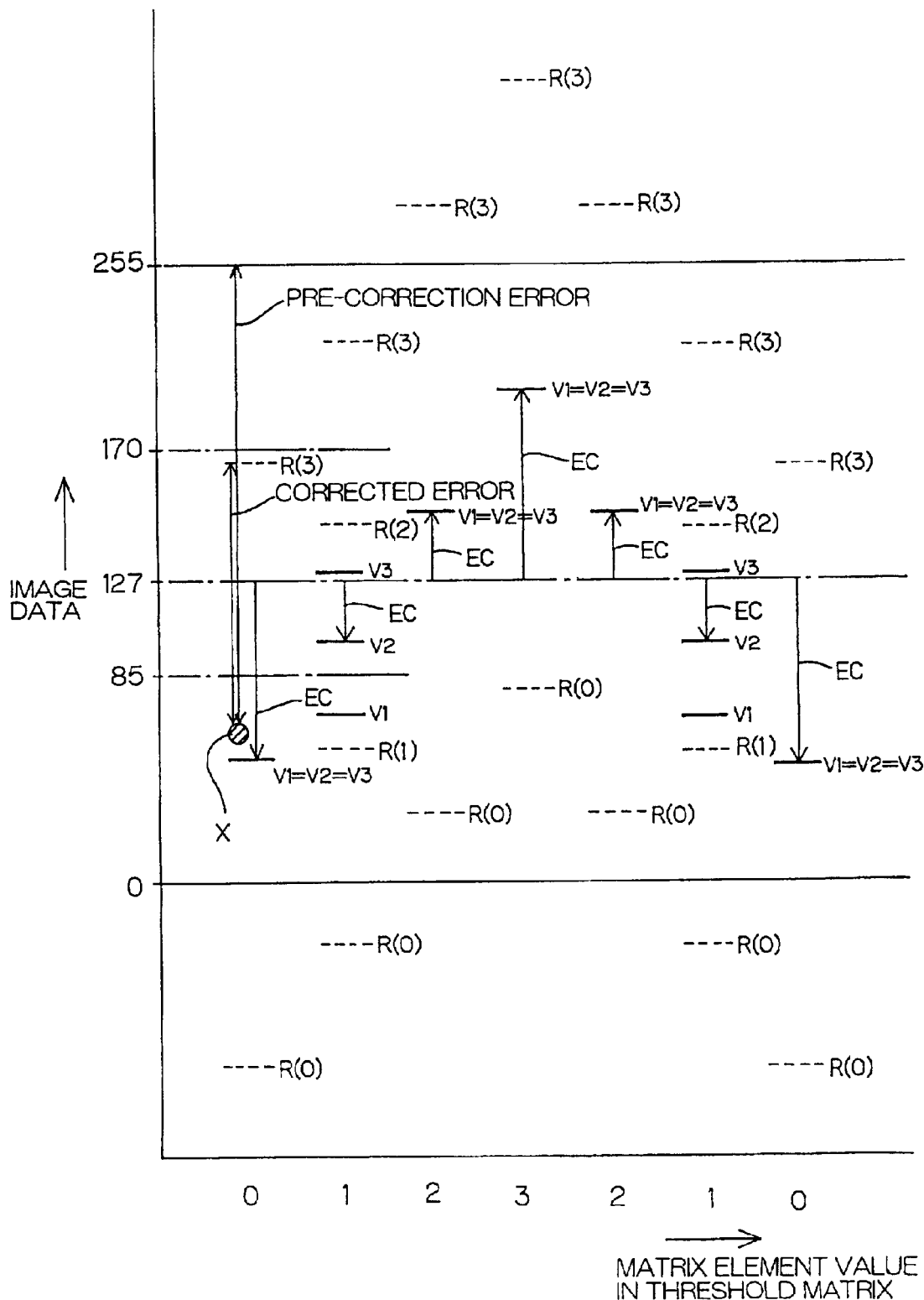
FIG. 16 is a diagram illustrating periodic variation of quantization thresholds and corresponding periodic variation of error calculation reference values.

FIG. 16 is a diagram illustrating the periodic variation of the quantization thresholds and the corresponding periodic variation of the reference values for the error calculation. When the quantization thresholds (variable thresholds) V1, V2, V3 periodically vary as indicated by bold lines in FIG. 16, the error correction value EC which is the deviation from the middle gradation level "127" varies as indicated by arrows in FIG. 16. In this case, downward arrows indicate that the error correction value EC is negative, while upward arrows indicate that the error correction value EC is positive.

For example, it is assumed that the variable thresholds V1=V2=V3 for the matrix element value "0" in the variable threshold matrix are set lower than the middle level "127". When the object pixel X has a value smaller than the middle level "127" and greater than the variable thresholds V1, V2, V3, the object pixel X is quantized into 3 indicative of a black pixel. At this time, the error calculating section 64 calculates a pre-correction error from the following expression:

Pre-correction error=(Value of object pixel X after addition of cumulative error)−255 (14)

In this case, an error having an absolute value greater than 127 is generated. Therefore, the pre-correction error is corrected so as to have a smaller absolute value by subtracting the error correction value EC therefrom. As the result of the correction, the corrected error has a smaller value according to the quantization thresholds V1, V2, V3. This correction is equivalent to a correction by which the reference value for the error calculation is corrected into a value R(3) which is smaller than the maximum gradation level "255".

In FIG. 16, a practical error calculation reference value employed when the image data of the object pixel is quantized into output data "0", "1", "2" or "3" is expressed as R(0), R(1), R(2) or R(3), respectively. Where the matrix element value in the variable threshold matrix is 1, the four-level quantization process is performed with the use of the variable thresholds V1, V2, V3 having different values and, correspondingly, there are four error calculation reference values R(0) R(1), R(2), R(3).

Figure 17:
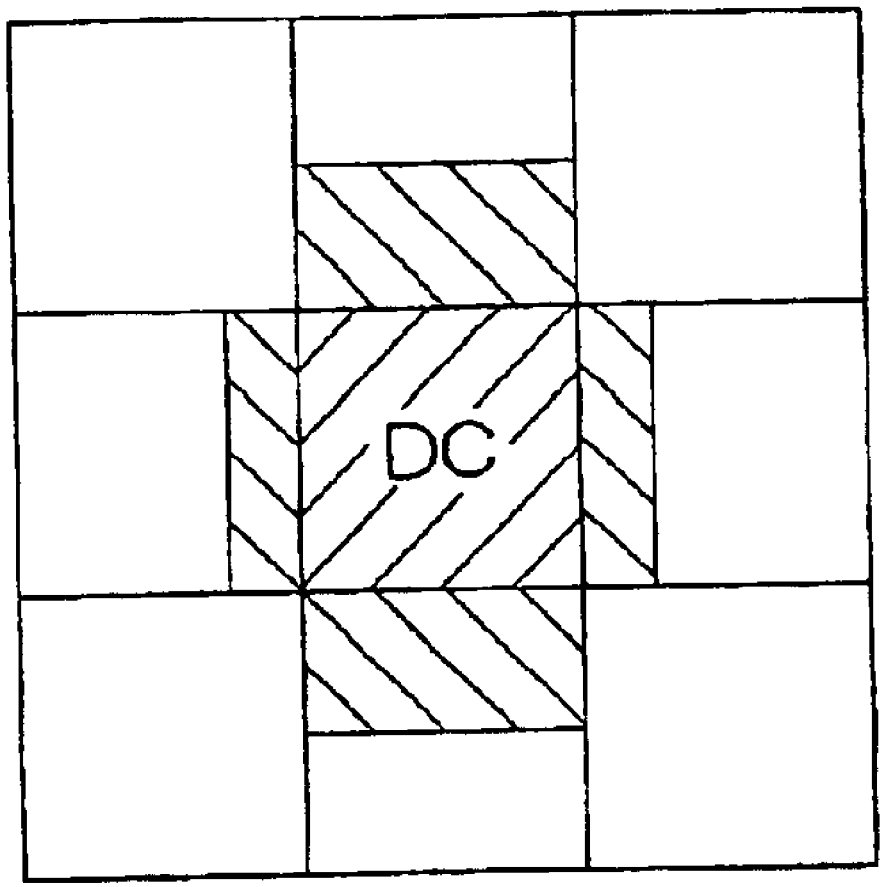
FIG. 17 is a diagram for explaining an effect of a higher-level quantization process to be performed for a specific matrix element value in the variable threshold matrix.
Figure 18A:
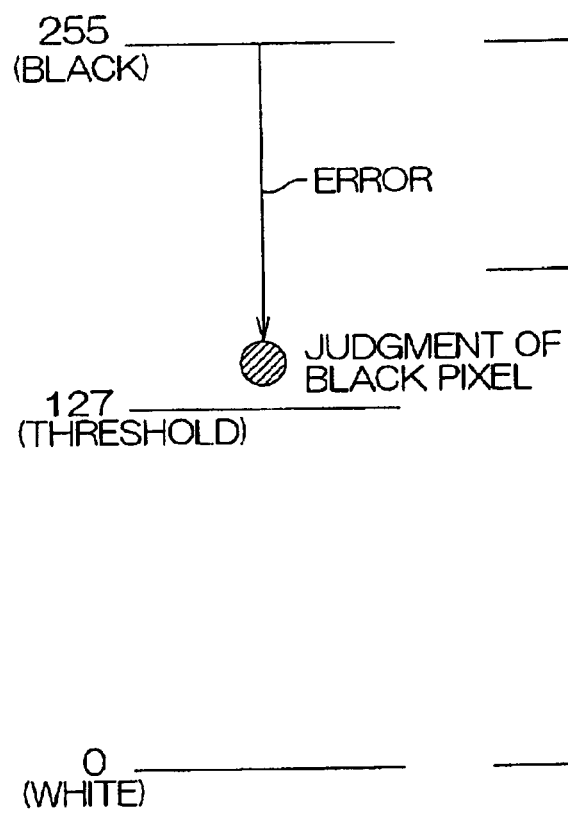
FIGS. 18(a) and 18(b) are diagrams for explaining variation of an error (quantization error) due to variation of a quantization threshold.
Figure 18B:
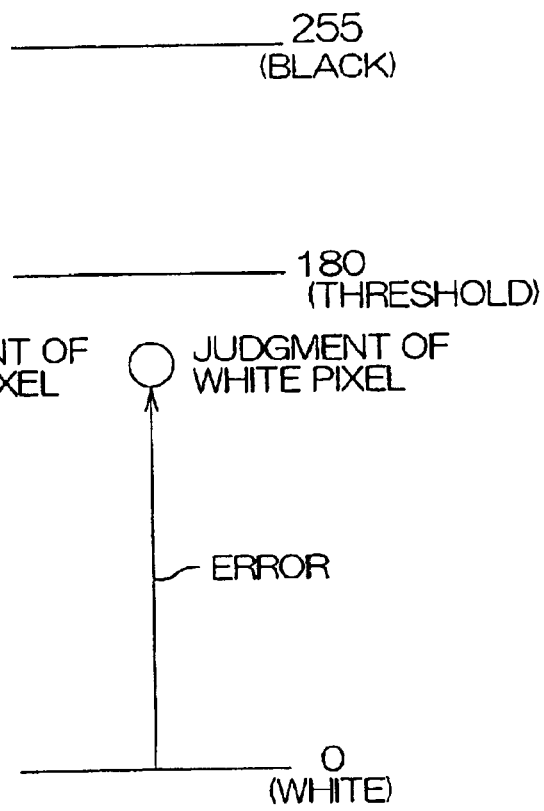

FIG. 17 is a diagram for explaining an effect of a higher-level quantization process (four-level quantization process in this embodiment) to be performed only for the specific matrix element value (1 in this embodiment) in the variable threshold matrix. As described above, the quantization thresholds can periodically two-dimensionally be varied by employing the variable threshold matrix shown in FIG. 14(a). As a result, the gradation of the photograph image can be represented by halftone dots with a predetermined line frequency (e.g., 141 lpi). Where a dot DC is formed as a core of a halftone dot, the expansion or contraction of the dot DC constituting the halftone dot can more finely be controlled through the four-level quantization of the pixels around the dot DC than through the two-level quantization of the pixels around the dot DC. That is, the output section 4 including the laser scanning unit controls a laser emission period or a laser intensity for each pixel at four levels on the basis of the image data quantized on a four-level (2-bit) basis, so that the size of the pixel to be recorded by the output section 4 can be controlled at four levels.

In this embodiment, a pixel (corresponding to the matrix element value "1" in the variable threshold matrix) adjacent to the saddle point (corresponding to the matrix element value "0" in the variable threshold matrix) in the periodic variation cycle of the quantization thresholds is subjected to the four-level quantization process. Thus, the dot expansion and contraction levels can finely be defined as compared with a case where the quantization is performed only on a two-level basis, allowing for more smooth gradation representation.

Although the four-level quantization process is performed on a pixel corresponding to the matrix element value "1" in the variable threshold matrix in this embodiment, this arrangement is merely one example. The higher-level quantization process (four-level quantization process in this embodiment) maybe performed on a pixel corresponding to the matrix element value "2" in the variable threshold matrix, or on pixels corresponding to matrix element values "1" and "2" in the variable threshold matrix.

In accordance with this embodiment, as described above, the pixels in the photograph image area can be extracted separately from the pixels in the other image areas on the basis of the result of the magnitude comparison between the sum TOTAL_SUM of the differences in image data between the pixels in the first image block (13×7 pixel matrix) containing the object pixel and the threshold TH (AV) determined in accordance with the average value AV of the image data in the first image block.

The pixels in the thin line image area can be prevented from being erroneously judged to belong to the photograph image area by comparing the sums H_SUM and V_SUM of the differences in the image data of the pixels aligning in the main scanning direction and in the sub-scanning direction in the second image block (5×5 pixel matrix) with the predetermined thresholds HL, HH, VL, VH. Therefore, the pixels in the photograph image can be extracted very accurately.

The image data subjected to the smoothing process performed by the pre-separation filtering section 39 is further subjected to the aforesaid area separating process, whereby the higher-line-frequency halftone dot image area (with a line frequency of not lower than 175 lpi) can assuredly be judged to belong to the photograph image area. Thus, the higher-line-frequency halftone dot image which is virtually free from a moiré pattern when subjected to the dotting process (improved error diffusion process) in the halftoning section 37 can be reproduced with proper gradation representation as in the case of the photograph image.

In this embodiment, the pixel judged to belong to the photograph image area is subjected to the improved error diffusion process by employing the variable thresholds V1, V2, V3 which are periodically two-dimensionally variable, whereby the dotting process can be performed on the higher-line-frequency halftone dot image with a line frequency of not lower than 175 lpi and the photograph image. Thus, the dot concentration halftoning process advantageous for the image formation through the electrophotographic process can be employed, allowing for image reproduction with excellent gradation representation.

On the other hand, the pixel judged not to belong to the photograph image area is subjected to the ordinary error diffusion process by employing the quantization thresholds each fixed at a predetermined value, whereby the character image, the diagrammatic image and the halftone dot image (with a lower line frequency) can be reproduced with a proper resolution, and are free from a moiré pattern.

In the improved error diffusion process of this embodiment, the reference values for the error calculation can be varied in phase with the variation of the quantization thresholds. This eliminates the possibility that a great quantization error which may otherwise be generated due to the variation of the quantization thresholds is distributed to the peripheral pixels around the object pixel. Therefore, black pixels for forming each halftone dot can effectively be concentrated, so that the dotting process can advantageously be performed through the improved error diffusion process. It is an additional advantage that the image density can assuredly be conserved.

In this embodiment, the peripheral pixels around the dot serving as the core of the halftone dot are subjected not to the two-level quantization process but to the four-level quantization process, whereby the dot expansion and contraction can be controlled at an increased number of levels. Therefore, the higher-line-frequency halftone dot image and the photograph image can be reproduced with smooth gradation representation.

While one embodiment of the present invention has thus been described, the invention may be embodied in any other ways. Although the matrix element value for the higher-level quantization process (four-level quantization process) is set at a fixed value in the embodiment described above, the matrix element value for the higher-level quantization process (four-level quantization process) may be variably set on the basis of an average value of image data within a third image block (for example, a matrix region having substantially the same size as the variable threshold matrix) containing the object pixel. In this case, a relationship between the average value of the image data in the third image block and the matrix element value may be defined as shown in Table 1, if the variable threshold matrix of FIG. 14(a) is employed.

TABLE 1

| Average value of image data | Threshold matrix element value |
|---|---|
| 0–63 | 0 |
| 64–127 | 1 |
| 128–191 | 2 |
| 192–255 | 3 |

With this arrangement, the four-level quantization process can assuredly be applied to pixels constituting the periphery of a dot (halftone dot) in any density region, allowing for more excellent gradation reproduction.

Although the error calculation reference values periodically variable with the periodic variation of the quantization thresholds have a predetermined variation range with respect to the values of the variable thresholds in the embodiment described above, the variation range may be varied depending on the value of image data of a pixel adjacent to the object pixel. For example, the dot concentration can be suppressed in a lower density region by increasing the variation range, whereby incongruous dot concentration can be suppressed, allowing for excellent image reproduction. On the other hand, dots can advantageously be concentrated in a high density region by reducing the variation range, allowing for excellent gradation reproducibility.

In the embodiment described above, the quantization process is performed selectively in two ways, i.e., on a two-level basis and on a four-level basis, but may be performed selectively in three or more ways. For example, the peripheral pixels around the pixel to be subjected to the two-level quantization process for formation of the dot core may be subjected to a three-level quantization process, and pixels surrounding the peripheral pixels may be subjected to the four-level quantization process.

In the embodiment described above, the four-level quantization process is performed for the peripheral pixels around the black pixel (the dot core pixel constituting the halftone dot), but may be performed for pixels to be located around a white pixel, so that gray pixels (black pixels each having a smaller area) are formed around the white pixel. In this case, the higher-level quantization process is performed on a pixel adjacent to a peak point in the quantization threshold variation cycle.

In the embodiment described above, the present invention is applied to the digital copying machine, but may widely be applied to image data processing apparatuses such as facsimile machines and printers adapted to perform image processing operations on inputted image data to form an image on a recording sheet.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

This application corresponds to Japanese Patent Applications No. 2000-287507 and No. 2000-287508 filed to the Japanese Patent Office on Sep. 21, 2000, the disclosure thereof being incorporated herein by reference.

What is claimed is:

1. An image processing apparatus for quantizing image data indicative of a density gradation level of a constituent pixel of an image into a discrete value on the basis of quantization levels of a number smaller than the maximum density gradation level and not smaller than two, the apparatus comprising:

an N-level/M-level quantization circuit for performing an N-level quantization process with the use of (N−1) N-level quantization thresholds (wherein N is an integer satisfying a relationship of (maximum density gradation level)>N≧2) or performing an M-level quantization process with the use of (M−1) M-level quantization thresholds (wherein M is an integer satisfying a relationship of (maximum density gradation level)>M >N) for quantization of image data of an object pixel on an N-level basis or on an M-level basis;

an error diffusion circuit for distributing an error generated through the N-level quantization process or the M-level quantization process performed by the N-level/M-level quantization circuit to peripheral pixels yet to be subjected to the N-level quantization process or the M-level quantization process around the object pixel for modification of image data of the peripheral pixels;

an N-level quantization threshold setting circuit for setting the N-level quantization thresholds to be used in the N-level/M-level quantization circuit in a periodically variable manner; and a process setting circuit for causing the N-level/M-level quantization circuit to perform the M-level quantization process for pixels adjacent to a pixel corresponding to at least one of a peak point and a saddle point in the periodic variation of the N-level quantization thresholds and causing the N-level/M-level quantization circuit to perform the N-level quantization process for pixels corresponding to the peak point and the saddle point.

2. An image processing apparatus as set forth in claim 1, wherein the N-level quantization threshold setting circuit sets the N-level quantization thresholds on the basis of a variable threshold matrix having matrix element values defined in a periodically variable manner, wherein the process setting circuit causes the N-level/M-level quantization circuit to perform the M-level quantization process for a pixel corresponding to a matrix position of a specific matrix element value in the variable threshold matrix.

3. An image processing apparatus as set forth in claim 1, wherein the process setting circuit comprises a circuit for defining the specific matrix element value on the basis of an average value of image data of pixels within a region of a predetermined size containing the object pixel and pixels around the object pixel.

4. An image processing apparatus as set forth in claim 1, wherein the N-level quantization threshold setting circuit comprises a circuit for variably setting the N-level quantization thresholds in accordance with the image data of the object pixel.

5. An image processing apparatus as set forth in claim 1, further comprising a circuit for variably setting the M-level quantization thresholds to be used in the N-level/M-level quantization circuit in accordance with the image data of the object pixel.

6. An image processing method for quantizing image data indicative of a density gradation level of a constituent pixel of an image into a discrete value on the basis of quantization levels of a number smaller than the maximum density gradation level and not smaller than two, the method comprising the steps of:

quantizing image data of an object pixel on an N-level basis (wherein N is an integer satisfying a relationship of (maximum density gradation level)>N≧2) or on an M-level basis (wherein M is an integer satisfying a relationship of (maximum density gradation level)>M >N) with the use of (N−1) periodically variable N-level quantization thresholds and (M−1) M-level quantization thresholds by performing an M-level quantization process for pixels adjacent to a pixel corresponding to at least one of a peak point and a saddle point in the periodic variation of the N-level quantization thresholds and performing an N-level quantization process for pixels corresponding to the peak point and the saddle point; and distributing an error generated through the N-level quantization process or the M-level quantization process to peripheral pixels yet to be subjected to the N-level quantization process or the M-level quantization process around the object pixel for modification of image data of the peripheral pixels.

7. An image processing apparatus for quantizing image data indicative of a density gradation level of a constituent pixel of an image into a discrete value on the basis of quantization levels of a number smaller than the maximum density gradation level and not smaller than two, the apparatus comprising:

a quantization circuit for quantizing image data of an object pixel with the use of a quantization threshold;

an error calculating circuit for calculating an error generated through the quantization performed by the quantization circuit;

an error diffusion circuit for distributing the error calculated by the error calculating circuit to peripheral pixels yet to be subjected to the quantization around the object pixel for modification of image data of the peripheral pixels;

a threshold setting circuit for setting the quantization threshold to be used in the quantization circuit in a periodically variable manner; and an error calculation reference value setting circuit for variably setting a reference value to be used for the error calculation in the error calculating circuit.

8. An image processing apparatus as set forth in claim 7, wherein the error calculation reference value setting circuit variably sets the error calculation reference value so that the reference value varies in phase with the variation of the quantization threshold set by the threshold setting circuit.

9. An image processing apparatus as set forth in claim 7, wherein the error calculation reference value setting circuit comprises a circuit for variably setting a variation range of the error calculation reference value with respect to the quantization threshold on the basis of the image data of the object pixel or an average value of image data of pixels within a region of a predetermined size containing the object pixel and pixels around the object pixel.

10. An image processing apparatus as set forth in claim 7, wherein the quantization circuit comprises a circuit for variably setting a variation rage of the error calculation reference value in accordance with an area separation signal indicative of a type of an image area to which the object pixel belongs.

11. An image processing apparatus as set forth in claim 7, wherein the quantization circuit comprises an N-level/M-level quantization circuit for performing an N-level quantization process with the use of (N−1) N-level quantization thresholds (wherein N is an integer satisfying a relationship of (maximum density gradation level)>N≧2) or performing an M-level quantization process with the use of (M−1) M-level quantization thresholds (wherein M is an integer satisfying a relationship of (maximum density gradation level)>M>N) for quantization of the image data of the object pixel on an N-level basis or on an M-level basis;

wherein the threshold setting circuit comprises an N-level quantization threshold setting circuit for setting the N-level quantization thresholds to be used in the N-level/M-level quantization circuit in a periodically variable manner;

the apparatus further comprising a process setting circuit for causing the N-level/M-level quantization circuit to perform the M-level quantization process for pixels adjacent to a pixel corresponding to at least one of a peak point and a saddle point in the periodic variation of the N-level quantization thresholds and causing the N-level/M-level quantization circuit to perform the N-level quantization process for pixels corresponding to the peak point and the saddle point.

12. An image processing apparatus as set forth in claim 11, wherein the N-level quantization threshold setting circuit sets the N-level quantization thresholds on the basis of a variable threshold matrix having matrix element values defined in a periodically variable manner, wherein the process setting circuit causes the N-level/M-level quantization circuit to perform the M-level quantization process for a pixel corresponding to a matrix position of a specific matrix element value in the variable threshold matrix.

13. An image processing apparatus as set forth in claim 11, wherein the process setting circuit comprises a circuit for defining the specific matrix element value on the basis of an average value of image data of pixels within a region of a predetermined size containing the object pixel and pixels around the object pixel.

14. An image processing apparatus as set forth in claim 11, wherein the N-level quantization threshold setting circuit comprises a circuit for variably setting the N-level quantization thresholds in accordance with the image data of the object pixel.

15. An image processing apparatus as set forth in claim 11, further comprising a circuit for variably setting the M-level quantization thresholds to be used in the N-level/M-level quantization circuit in accordance with the image data of the object pixel.

16. An image processing method for quantizing image data indicative of a density gradation level of a constituent pixel of an image into a discrete value on the basis of quantization levels of a number smaller than the maximum density gradation level and not smaller than two, the method comprising the steps of:

quantizing image data of an object pixel with the use of a quantization threshold;

calculating an error generated through the quantization;

distributing the calculated error to peripheral pixels yet to be subjected to the quantization around the object pixel for modification of image data of the peripheral pixels;

setting the quantization threshold in a periodically variable manner; and variably setting a reference value for the error calculation.

17. An image processing method as set forth in claim 16, wherein the error calculation reference value is set so as to be variable in phase with the variation of the quantization threshold.

18. An image processing method as set forth in claim 16, wherein the quantization step comprises the step of quantizing the image data of the object pixel on an N-level basis (wherein N is an integer satisfying a relationship of (maximum density gradation level)>N≧2) or on an M-level basis (wherein M is an integer satisfying a relationship of (maximum density gradation level)>M>N) with the use of (N−1) periodically variable N-level quantization thresholds and (M−1) M-level quantization thresholds by performing an M-level quantization process for pixels adjacent to a pixel corresponding to at least one of a peak point and a saddle point in the periodic variation of the N-level quantization thresholds and by performing an N-level quantization for pixels corresponding to the peak point and the saddle point.

* * * * *